United States Patent
Choi et al.

(10) Patent No.: US 7,528,915 B2
(45) Date of Patent: May 5, 2009

(54) OPTICAL MODULE, METHOD OF FORMING THE OPTICAL MODULE, BACKLIGHT ASSEMBLY HAVING THE OPTICAL MODULE AND DISPLAY DEVICE HAVING THE BACKLIGHT ASSEMBLY

(75) Inventors: Jin-Sung Choi, Yongin-si (KR); Jheen-Hyeok Park, Seongnam-si (KR); Dong-Hoon Kim, Seoul (KR); Jong-Dae Park, Seoul (KR); Jin-Mi Jung, Seoul (KR); Jeong-Hwan Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 227 days.

(21) Appl. No.: 11/217,537

(22) Filed: Sep. 1, 2005

(65) Prior Publication Data
US 2006/0098452 A1 May 11, 2006

(30) Foreign Application Priority Data
Nov. 9, 2004 (KR) ............... 10-2004-0090649

(51) Int. Cl.
*G02F 1/1333* (2006.01)
*F21V 7/04* (2006.01)
(52) U.S. Cl. ............................ 349/122; 362/607
(58) Field of Classification Search ................ 349/122; 362/607
See application file for complete search history.

(56) References Cited

U.S. PATENT DOCUMENTS

| 6,433,853 | B1 * | 8/2002 | Kameyama et al. | 349/176 |
|---|---|---|---|---|
| 6,581,286 | B2 * | 6/2003 | Campbell et al. | 29/895.31 |
| 7,202,922 | B2 * | 4/2007 | Ito | 349/96 |
| 2003/0176124 | A1 * | 9/2003 | Koike et al. | 442/16 |
| 2004/0008506 | A1 * | 1/2004 | Son | 362/31 |
| 2004/0056994 | A1 * | 3/2004 | Honda et al. | 349/112 |

FOREIGN PATENT DOCUMENTS

EP    0196861    10/1986

* cited by examiner

*Primary Examiner*—Charlie Peng
(74) *Attorney, Agent, or Firm*—Cantor Colburn LLP

(57) ABSTRACT

A display device comprises an optical module, a light source unit, a container and a display panel. The optical module comprises at least one optical member and a transparent adhesion member combined with the optical member. The optical member has a first modulus of elasticity, and the transparent adhesion member has a second modulus of elasticity that is substantially identical to the first modulus of elasticity. The light source unit is disposed in a light providing region of the display device to generate a light. The container receives the light source unit and the optical module. The display panel is received in the container and disposed in a display region of the display device. The display panel displays an image based on a light passing through the optical module.

15 Claims, 24 Drawing Sheets

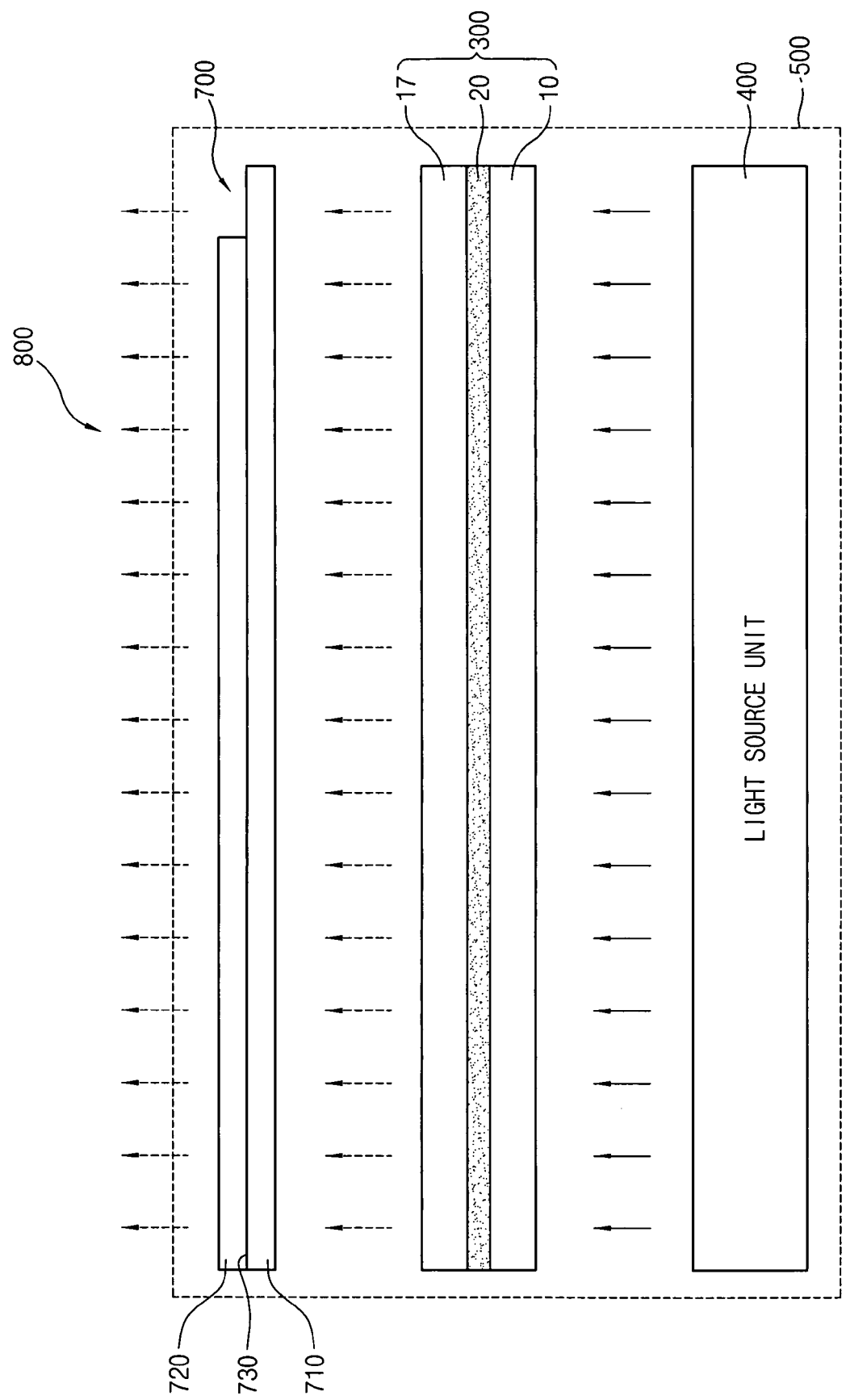

OPTICAL MODULE, METHOD OF FORMING THE OPTICAL MODULE, BACKLIGHT ASSEMBLY HAVING THE OPTICAL MODULE AND DISPLAY DEVICE HAVING THE BACKLIGHT ASSEMBLY

This application claims priority to Korean Patent Application No. 2004-90649 filed on Nov. 9, 2004 and all the benefits accruing therefrom under 35 U.S.C. §119, and the contents of which in its entirety are herein incorporated by reference.

BACKGROUND OF THE INVENTION

1. Field of the Invention

The present invention relates to an optical module, a method of forming the optical module, a backlight assembly comprising the optical module and a display device having the backlight assembly. More particularly, the present invention relates to an optical module having an improved ability to display high quality images, a method of forming the optical module, a backlight assembly comprising the optical module, and a display device comprising the backlight assembly.

2. Description of the Related Art

Generally, a display device converts electrical signals to display an image therethrough. For example, a liquid crystal display (LCD) device displays images using electrical and optical characteristics of liquid crystal contained therein. The liquid crystal typically has an electrical characteristic that can be varied in accordance with an applied electric field. The liquid crystal also has an optical characteristic that permits its light transmittance to vary in accordance with the applied electrical field.

A conventional LCD device generally comprises a light providing part for generating a light, and a liquid crystal controlling part for adjusting a light transmittance of the liquid crystal. The light providing part usually comprises a light source for generating the light and optical members for improving characteristics of the light generated from the light source. The conventional LCD device has at least two optical members.

Although the quality of images displayed by conventional LCD devices may be improved, conventional LCD devices have high weights and volumes since they generally comprise more than two optical members.

SUMMARY OF THE INVENTION

The present invention provides an optical module having a reduced volume and a decreased weight.

The present invention also provides a method of forming an optical module having a reduced volume and a decreased weight.

The present invention also provides a backlight assembly that comprises the optical module that has a reduced volume and a decreased weight.

The present invention further provides a display device comprising a backlight assembly that has a reduced volume and a decreased weight.

In accordance with one aspect of the present invention, there is provided an optical module that comprises an optical member configured to emit light by converting characteristics of the light incident upon it, and a transparent adhesion member integrally formed with the optical member. The optical member has a first modulus of elasticity and the transparent adhesion member has a second modulus of elasticity.

In exemplary embodiments of the present invention, the optical module may provide the light onto a display region of a display device for displaying an image.

In exemplary embodiments of the present invention, the transparent adhesion member may have a refractive index of about 1.0 to about 2.0. In addition, the transparent adhesion member may have a glass transition temperature of about 70° C. to about −40° C.

In exemplary embodiments of the present invention, the transparent adhesion member may comprise methyl methacrylate, ethyl methacrylate, n-propyl methacrylate, n-butyl methacrylate, n-hexyl methacrylate (nHMA), isopropyl methacrylate, isobutyl methacrylate, t-butyl methacrylate, cyclohexyl methacrylate, benzyl methacrylate, phenyl methacrylate, 1-phenylethyl methacrylate, 2-phenylethyl methacrylate, furfuryl methacrylate, methyl acrylate, ethyl acrylate, n-butyl acrylate, 2-chloroethyl acrylate, vinyl acetate, vinyl benzoate, vinyl phenylacetate, vinyl chloroacetate, acrylonitrile, x-methyl acrylonitrile, methyl-x-chloroacrylate, atropic acid, methyl ester, o-chlorostyrene, p-fluorostyrene, (o,p)-fluorostyrene or p-isopropyl styrene. These can be used alone or in a mixture thereof.

In an exemplary embodiment of the present invention, the optical member may comprise a diffusing plate attached to a first side of the transparent adhesion member to diffuse the light, and a dual brightness enhancing film attached to a second side of the transparent adhesion member to improve the luminance of the light. In addition, the optical member may further comprise a brightness enhancing film facing the dual brightness enhancing film to collect the light passing through the dual brightness enhancing film. Here, the transparent adhesion member may comprise a first adhesion layer disposed between the diffusing plate and the dual brightness enhancing film, and a second adhesion layer disposed between the dual brightness enhancing film and the brightness enhancing film. The brightness enhancing film may comprise a plurality of prismatic patterns having an angle of about 22.5° relative to an edge of the brightness enhancing film to prevent a Moire Effect.

In an exemplary embodiment of the present invention, the optical member may comprise a diffusing plate attached to a first side of the transparent adhesion member to diffuse the light, and a brightness enhancing film-reflector polarizer attached to a second side of the transparent adhesion member to improve the luminance of the light and to collect the light.

In another exemplary embodiment of the present invention, the optical member may comprise a diffusing plate attached to a first side of the transparent adhesion member to diffuse the light, and a cholesteric liquid crystal film attached to a second side of the transparent adhesion member to improve the luminance of the light. The cholesteric liquid crystal film may comprise a cholesteric liquid crystal.

In yet another exemplary embodiment of the present invention, the optical member may comprise a diffusing plate attached to a first side of the transparent adhesion member to diffuse the light, and a diffusive reflective polarizer film attached to a second side of the transparent adhesion member to improve the luminance of the light. The diffusive reflective polarizer film may comprise a polymer film with organic particles disposed in the polymer film.

In an exemplary embodiment of the present invention, the optical member may comprise a light guide plate to improve the uniformity of the luminance.

In an exemplary embodiment of the present invention, the optical member may comprise a polarizing plate to polarize the light.

In an exemplary embodiment of the present invention, the optical module may further comprise a detachable sheet disposed on the transparent adhesion member. The first modulus of elasticity (which applies to the detachable sheet) may be substantially identical to the second modulus of elasticity (which applies to the transparent adhesion member).

In accordance another aspect of the present invention, there is provided an optical module comprising an optical member configured to emit a light by converting characteristics of the light, and a flexible transparent adhesion member integrally formed with the optical member. The flexible transparent adhesion member prevents the optical member from bending by reducing a stress generated in the optical member.

In exemplary embodiments of the present invention, the optical member may have a first modulus of elasticity and the flexible transparent adhesion member may have a second modulus of elasticity that is substantially identical to the first modulus of elasticity.

In accordance with yet another aspect of the present invention, there is provided a method of forming an optical module. In the method of forming the optical module, an optical member is provided to emit a light by converting characteristics of the light. The optical member has a first modulus of elasticity. A transparent adhesion member having a second modulus of elasticity is disposed between a first detachable sheet and a second detachable sheet. The optical member is combined with the transparent adhesion member by stripping away one of the first and the second detachable sheets from the transparent adhesion member and contacting the stripped surface with the optical member.

In an exemplary embodiment of the present invention, the optical member may be combined with the transparent adhesion member by pressing the optical member against the transparent adhesion member at a room temperature.

In an exemplary embodiment of the present invention, the remaining detachable sheet may then be stripped away after combining the optical member with the transparent adhesion member.

In accordance with yet another aspect of the present invention, there is provided a backlight assembly comprising a light source unit for generating a light, an optical module and a container. The optical module comprises at least one optical member and a transparent adhesion member in communication with the optical member. The optical member has a first modulus of elasticity and the transparent adhesion member has a second modulus of elasticity. The container receives the light source unit and the optical module.

In an exemplary embodiment of the present invention, the light source unit may comprise a plurality of light sources disposed on a bottom face of the container in a first direction. Here, the light sources may be arranged in parallel along a second direction substantially perpendicular to the first direction.

In an exemplary embodiment of the present invention, the optical member may comprise a diffusing plate attached to a first side of the transparent adhesion member to diffuse the light, and a dual brightness enhancing film attached to a second side of the transparent adhesion member to improve the luminance of the light passing through the diffusing plate.

In an exemplary embodiment of the present invention, the optical member may comprise a diffusing plate attached to a first side of the transparent adhesion member to diffuse the light, a dual brightness enhancing film attached to a second side of the transparent adhesion member to improve the luminance of the light passing through the diffusing plate, and a brightness enhancing film facing the dual brightness enhancing film to collect the light emanating from the dual brightness enhancing film. Here, the transparent adhesion member may comprise a first adhesion layer disposed between the diffusing plate and the dual brightness enhancing film, and a second adhesion layer disposed between the dual brightness enhancing film and the brightness enhancing film.

In an exemplary embodiment of the present invention, the optical member may comprise a diffusing plate attached to a first side of the transparent adhesion member to diffuse the light, and a cholesteric liquid crystal film attached to a second side of the transparent adhesion member to improve the luminance of the light. The cholesteric liquid crystal film may comprise a cholesteric liquid crystal.

In an exemplary embodiment of the present invention, the optical member may comprise a light diffusing plate attached to a first side of the transparent adhesion member to diffuse the light, and a diffusive reflective polarizer film attached to a second side of the transparent adhesion member to improve the luminance of the light. The diffusive reflective polarizer film may comprise a polymer film with organic particles disposed in the polymer film.

In an exemplary embodiment of the present invention, the light source unit may be disposed on a sidewall of the container.

In an exemplary embodiment of the present invention, the optical member may comprise a light guide plate adjacent to the light source unit to improve the luminance of the light generated by the light source unit, a diffusing sheet facing a light exiting face of the light guide plate, a dual brightness enhancing film disposed on the diffusing sheet, and a prism film disposed on the dual brightness enhancing film. The transparent adhesion member may comprise a first adhesion layer disposed between the light guide plate and the diffusing sheet, a second adhesion layer disposed between the diffusing sheet and the dual brightness enhancing film, and a third adhesion layer disposed between the dual brightness enhancing film and the prism sheet.

In an exemplary embodiment of the present invention, the light source unit may comprise a flat body that comprises a first substrate, a second substrate, electrodes and a fluorescent layer. The first substrate faces the second substrate to provide a plurality of discharge spaces. The electrodes form discharges in the discharge spaces so as to generate invisible rays from the discharge spaces. The fluorescent layer is formed on the flat body to convert the invisible rays into visible rays. The first substrate and the optical member may have plate-like shapes. The optical member may be attached to a first side of the transparent adhesion member and the first substrate may be attached to the second side of the transparent adhesion member. The electrodes may be disposed on the second substrate. The first substrate may have a concave and convex shape, and the optical member may have a shape corresponding to the first substrate. The first and the second substrates may have a plate-like shape. An isolating member may be disposed between the first and the second substrates to provide the discharge spaces. A sealing member may be disposed between peripheral portions of the first and the second substrates.

In accordance with yet another aspect of the present invention, there is provided a display device comprising an optical module, a light source unit, a container and a display panel. The optical module comprises at least one optical member and a transparent adhesion member that is combined with the optical member. The optical member has a first modulus of elasticity and the transparent adhesion member has a second modulus of elasticity. The light source unit is disposed in a light providing region of the display device to generate light. The container receives the light source unit and the optical module. The display panel is received in the container and is disposed in a display region of the display device. The display panel displays an image based on the light passing through the optical module.

In an exemplary embodiment of the present invention, the optical member may comprise a diffusing plate configured to diffuse the light generated from the light source unit, and a dual brightness enhancing film configured to improve a luminance of the light passing through the diffusing plate. Here, the transparent adhesion member may be disposed between the diffusing plate and the dual brightness enhancing film.

In an exemplary embodiment of the present invention, the optical member may comprise a diffusing plate configured to diffuse the light generated from the light source unit, a dual brightness enhancing film configured to improve the luminance of light passing through the diffusing plate, and a brightness enhancing film configured to collect the light emanating from the dual brightness enhancing film. Here, the transparent adhesion member may comprise a first adhesion layer disposed between the diffusing plate and the dual brightness enhancing film, and a second adhesion layer disposed between the dual brightness enhancing film and the brightness enhancing film.

In an exemplary embodiment of the present invention, the optical member may comprise a diffusing plate configured to diffuse the light generated from the light source unit, and a cholesteric liquid crystal film configured to improve a luminance of the light. The cholesteric liquid crystal film may comprise a cholesteric liquid crystal. Here, the adhesion member may be disposed between the diffusing plate and the cholesteric liquid crystal film.

In an exemplary embodiment of the present invention, the optical member may comprise a diffusing plate configured to diffuse the light generated from the light source unit, and a diffusive reflective polarizer film configured to improve a luminance of the light. The diffusive reflective polarizer film may comprise a polymer film with organic particles disposed in the polymer film. Here, the transparent adhesion member may be disposed between the diffusing plate and the diffusive reflective polarizer film.

According to the present invention, various optical members that can improve the characteristics of incident light are combined with each other using at least one adhesion member so that an optical module having the optical members may have a greatly reduced volume and weight. In addition, since the adhesion member is disposed between the optical members, the optical members may not be bent and may not be separated from each other. When a backlight assembly comprises the optical module, the backlight assembly may also have a considerably reduced volume and weight. In case that the optical module is employed in a display device such as an LCD device, the display device may display an improved image and may have a greatly reduced volume and weight.

BRIEF DESCRIPTION OF THE DRAWINGS

The above and other features and advantages of the present invention will become readily apparent by reference to the following detailed description when considered in conjunction with the accompanying drawings, wherein:

FIG. 26 is an exemplary cross-sectional view illustrating a display device in accordance with the present invention.

DETAILED DESCRIPTION OF THE INVENTION

Figure 1:
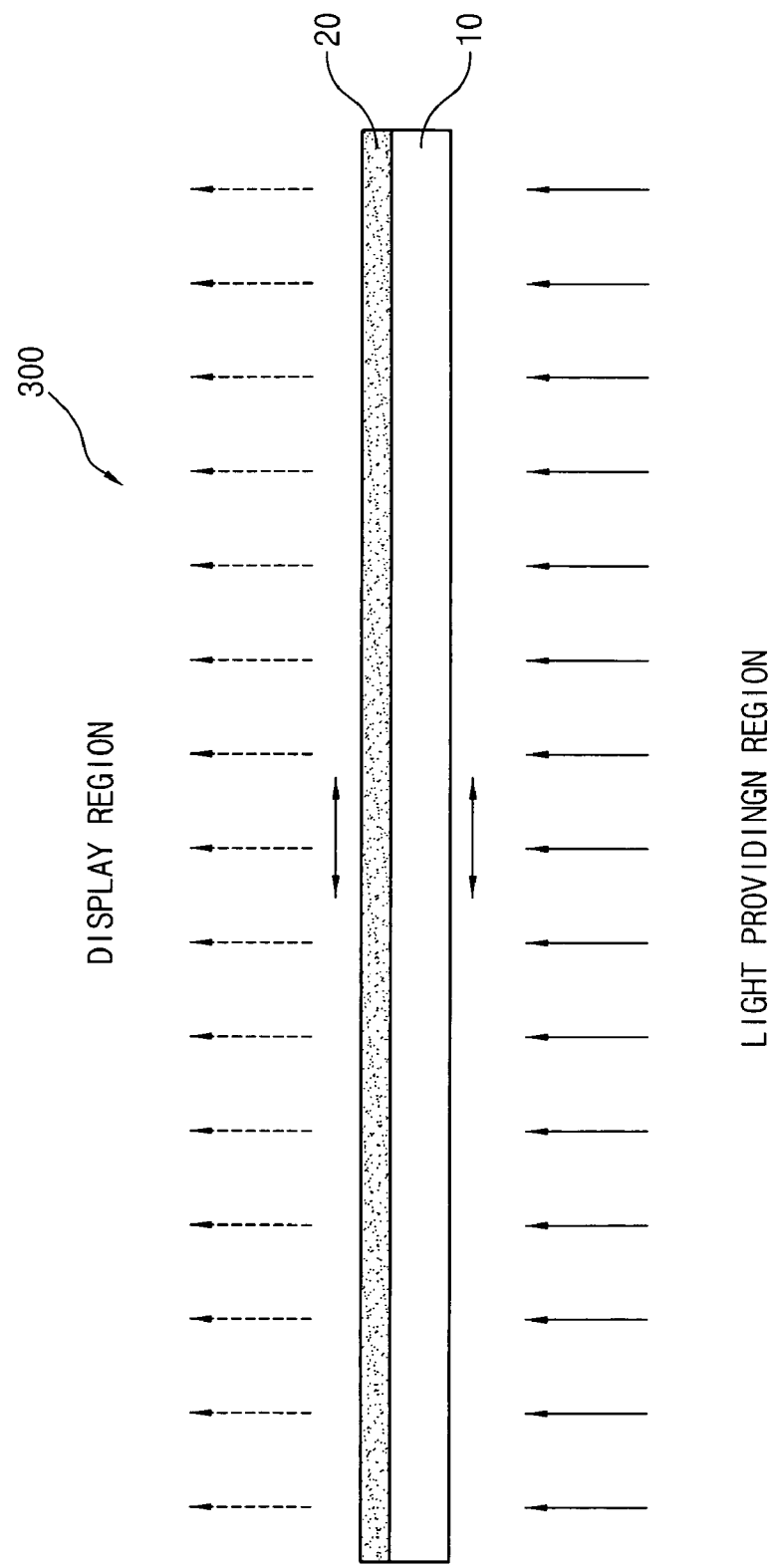
FIG. 1 is an exemplary cross-sectional view illustrating an optical module of a display device in accordance with the present invention.

The present invention is described more fully hereinafter with reference to the accompanying drawings, in which various embodiments of the invention are depicted. The present invention should not, however, be construed as being limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third or the like may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or one feature's relationship to other element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is an exemplary cross-sectional view illustrating an optical module of a display device in accordance with the present invention.

Referring to FIG. 1, an optical module 300 of a display device includes an optical member 10 and an adhesion member 20.

The optical module 300 is disposed between a light providing region of the display device and a display region of the display device. A display panel of the display device may be positioned in the display region of the display device. The display panel may display images by converting light into an image after the light is incident on the display panel of the display device. A light passing through the optical member 10 has characteristics substantially greater than those of a light generated from the light providing region. The optical member 10 may be commonly employed in various display devices. For example, the optical member 10 may be installed in a liquid crystal display (LCD) device. When the LCD device includes the optical member 10, the LCD device may display high quality images in comparison with conventional LCD devices.

The optical member 10 may include a diffusing plate, a diffusing sheet, a dual brightness enhancing film (DBEF), a brightness enhancing film (BEF), a brightness enhancing film-reflect polarizer (BEF-RP), a cholesteric liquid crystal film (CLCF), a diffusive reflective polarizer film (DRPF), a retardation plate, a protective film, a light guide plate (LGP), a polarizing plate, a light reflector, or a combination comprising at least one of the foregoing.

In an exemplary embodiment of the present invention, the optical member 10 may include two plates, two sheets, or one plate and one sheet. For example, the optical member 10 may include a diffusing plate and a DBEF, a diffusing plate and a BEF, a diffusing plate and a diffusing sheet, a diffusing plate and a DRPF, an LGP and a diffusing sheet, or the like.

In an exemplary embodiment of the present invention, the optical member 10 may include at least three plates, three sheets, two plates and one sheet, or one plate and two sheets. For example, the optical member 10 may include a diffusing sheet, a DBEF and a BEF.

The adhesion member 20 may include a transparent material so that the amount of light incident on the adhesion member 20 is substantially identical to the amount of light exiting from the adhesion member 20. In addition, the adhesion member 20 may include the transparent material having a predetermined flexibility.

The adhesion member 20 may include a transparent acrylate-based synthetic resin. Here, examples of a material that can be used for the adhesion member 20 may include methyl methacrylate, ethyl methacrylate, n-propyl methacrylate, n-butyl methacrylate, n-hexyl methacrylate (nHMA), isopropyl methacrylate, isobutyl methacrylate, t-butyl methacrylate, cyclohexyl methacrylate, benzyl methacrylate, phenyl methacrylate, 1-phenylethyl methacrylate, 2-phenylethyl methacrylate, furfuryl methacrylate, methyl acrylate, ethyl acrylate, n-butyl acrylate, 2-chloroethyl acrylate, vinyl acetate, vinyl benzoate, vinyl phenylacetate, vinyl chloroacetate, acrylonitrile, x-methyl acrylonitrile, methyl-x-chloroacrylate, atropic acid, methyl ester, o-chlorostyrene, p-fluorostyrene, (o,p)-fluorostyrene, p-isopropyl styrene, or the like. These can be used alone or in a combination thereof.

The transparent acrylate-based synthetic resin used in the adhesion member 20 may have a refractive index of about 1.1 to about 2.0, and have a secondary glass transition temperature of about 70° C. to about −40° C.

The adhesion member 20 may have a plate-like shape. In one exemplary embodiment of the present invention, the adhesion member 20 having the plate-like shape may be disposed on the optical member 10. In another exemplary embodiment of the present invention, the adhesion member 20 may be disposed between two optical members. That is, the optical module 300 may include two optical members 10 and one adhesion member 20 interposed between the optical members 10. In yet another exemplary embodiment of the present invention, the adhesion member 20 may be integrally formed with the optical member 10.

The adhesion member 20 may have a second modulus of elasticity II corresponding to a first modulus of elasticity I of the optical member 10. In one embodiment, the second modulus of elasticity II of the adhesion member 20 is substantially identical to the first modulus of elasticity I of the optical member 10. Thus, coefficient of thermal expansion for the adhesion member 20 may be substantially identical to that of the optical member 10.

In one exemplary embodiment of the present invention, when one adhesion member 20 is disposed between two optical members 10, the optical members 10 will not bend or separate from each other in the presence of moisture or heat because the adhesion member 20 has a coefficient of thermal expansion substantially identical with that of the optical members 10. In addition, the optical members 10 may have improved characteristics by preventing the formation of air bubbles between the optical members 10 and the adhesion member 20 that is interposed between the optical members 10. Furthermore, the optical members 10 may not be damaged by heat because the adhesion member 20 may combine one optical member 10 with another optical member 10 at a room temperature. When the display device having a backlight assembly includes the optical module 300, the display device may have a greatly reduced volume and weight because the optical module 300 comprising the adhesion member 20 and the optical member 10 may have composite structures that can function efficiently without bending or separation thereof.

Figure 2:
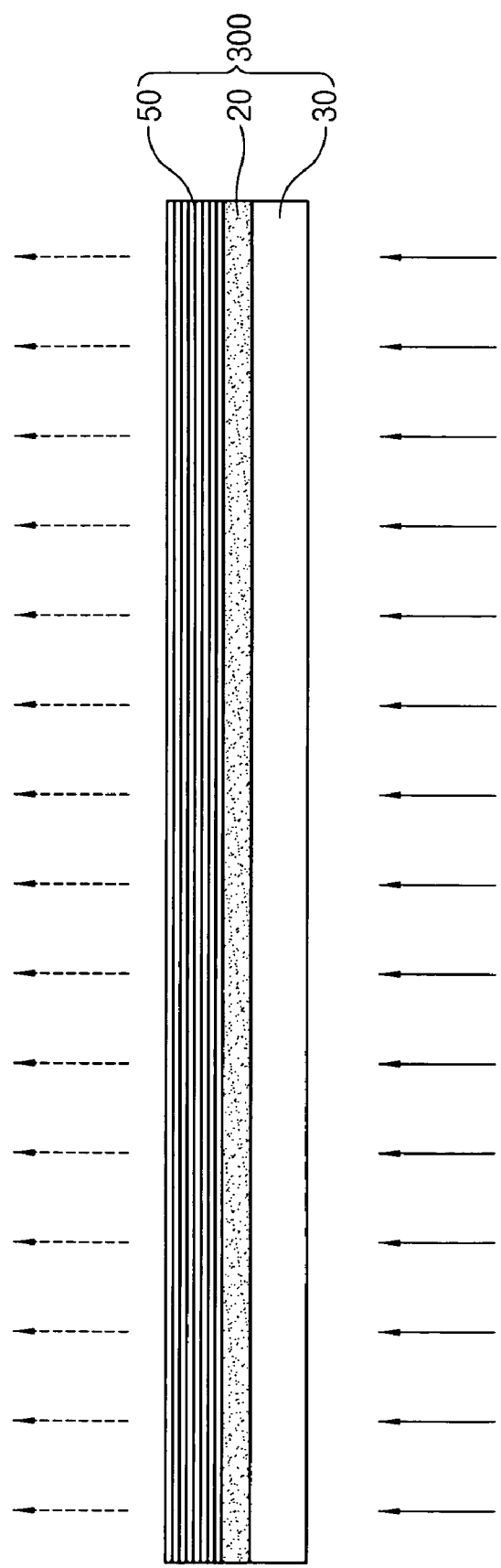
FIG. 2 is an exemplary cross-sectional view illustrating an optical module in accordance with the present invention.

FIG. 2 is an exemplary embodiment of a cross-sectional view illustrating an optical module in accordance with the present invention.

Referring to FIG. 2, an optical module 300 includes a diffusing plate 30, a DBEF 50, and an adhesion member 20.

The diffusing plate 30 diffuses the light incident into the optical module 300 to improve the uniformity of the luminance. Examples of a material that can be used for the diffusing plate 30 may include polycarbonate, polysulfonate, polystyrene, polyvinyl chloride, polyvinyl alcohol, polynorbornene, polyester, polyethylene terephthalate (PET), polyethylene naphthalate (PEN), or the like. These materials can be used alone or in combinations thereof. The diffusing plate 30 may further include a diffusing agent for effectively diffusing the light incident into the optical module 300. Alternatively, the diffusing plate 30 may further include a plurality of sequentially stacked diffusing films.

The DBEF 50 may particularly improve a luminance of images in an LCD device. The LCD device may include a polarizing plate where a light including a P-wave and an S-wave is incident. The polarizing plate may pass the P-wave of the light, whereas may block the S-wave of the light. Since the P-wave of the light may be blocked by the polarizing plate, an amount of the light including the S-wave only incident into the LCD device is about a half of an entire amount of the light before polarizing the light. The DBEF 50 changes the P-wave of the light into the S-wave of the light before the light is irradiated into the LCD device so that the luminance of the image displayed through the LCD device may be improved by increasing the entire amount of the light.

The DBEF 50 may have a structure in which at least one light reflective layer and at least one light transmittable layer alternatively stacked each other. The light reflective layer may reflect the light incident thereto, and the light transmittable layer may transmit the light incident passing therethrough. For example, scores of light reflective layers and scores of light transmittable layers are alternatively stacked on the adhesion member 20 to form the DBEF 50. Alternatively, hundreds of light reflective layers and hundreds of light transmittable layers may be stacked in turns on the adhesion member 20 to form the DBEF 50.

Examples of a material that can be used for the DBEF 50 may include polycarbonate, polysulfonate, polystyrene, polyvinyl chloride, polyvinyl alcohol, polynorbornene, polyester, polyethylene terephthalate (PET), polyethylene naphthalate (PEN), or the like. These can be used alone or in combinations thereof.

The adhesion member 20 is attached to the diffusing plate 30 and the DBEF 50. The adhesion member 20 may be integrally formed with the diffusing plate 30 and/or the DBEF 50. The diffusing plate 30 is positioned beneath one side of the adhesion member 20, and the DBEF 50 is disposed on the other side of the adhesion member 20.

The adhesion member 20 is transparent to light and can be adhesively coupled to the diffusing plate 30 and the DBEF 50 with an effective adhesive strength. In addition, the adhesion member 20 may not generate bubbles when it encounters heat. The materials used in the adhesion member 20 may have a refractive index of about 1.0 to about 2.0, and a secondary glass transition temperature of about 70° C. to about −40° C. In an exemplary embodiment of the present invention, the adhesion member 20 may include an adhesive material or an adhesive sheet. For example, the adhesion member 20 includes an adhesive sheet for a transparent plate such as "Clear Fit" (trade name manufactured by Mitsubishi Co. in Japan).

The adhesion member 20 is contracted or expanded corresponding to a contraction or an expansion of the diffusing plate 30. In an exemplary embodiment, the adhesion member 20 has a thermal coefficient of expansion that is about the same as that of the diffusing plate 30. Additionally, the adhesion member 20 is contracted or expanded corresponding to a contraction or an expansion of the DBEF 50. In another exemplary embodiment, the adhesion member 20 has a thermal coefficient of expansion that is about the same as that of the DBEF 50. The adhesion member 20 is thus contracted or expanded in accordance with the contractions and expansions of the diffusing plate 30 and the DBEF 50. The diffusing plate 30 and the DBEF 50 are in communication with each other by means of the adhesion member 20. Since the adhesion member 20 is bonded to the diffusing plate 30 and the DBEF 50, the diffusing plate and the DBEF 50 cannot be easily separated from each other due to moisture and/or heat.

When the optical module 300 includes the diffusing plate 30 and the DBEF 50 in communication with the adhesion member 20 as detailed above, the optical module 300 may be advantageously employed in an LCD device. Thus, the LCD device including the optical module 300 may have a greatly reduced volume and weight.

Figure 3:
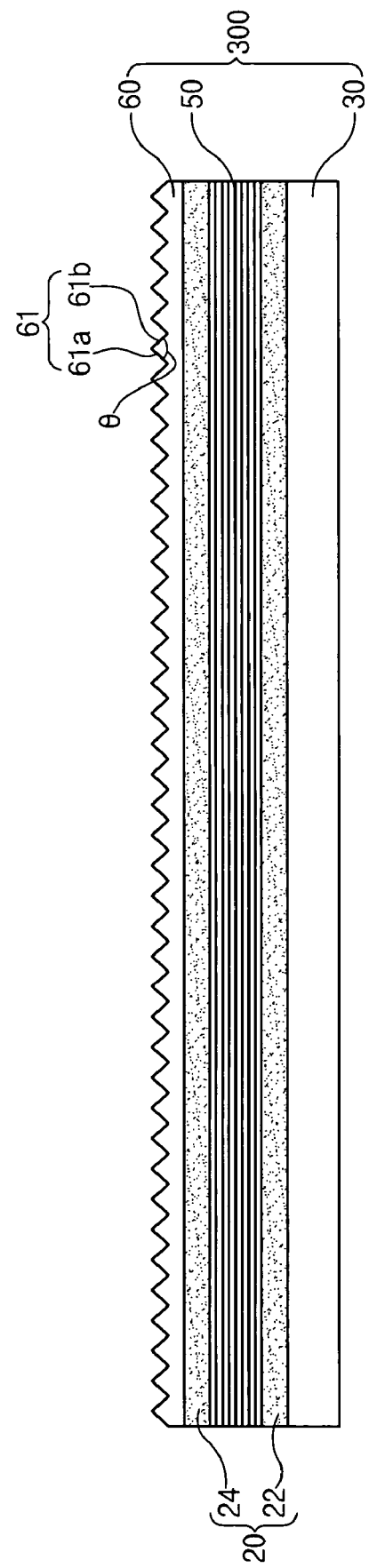
FIG. 3 is an exemplary cross-sectional view illustrating an optical module in accordance with the present invention.

FIG. 3 is an exemplary cross-sectional view illustrating an optical module in accordance with the present invention.

Referring to FIG. 3, an optical module 300 comprises a diffusing plate 30, a DBEF 50, a BEF 60 and an adhesion member 20.

In one embodiment, the BEF 60 is disposed to face the DBEF 50. The BEF 60 may have a plate-like shape. The BEF 60 includes a prismatic pattern 61 on a face thereof. The light incident upon the BEF 60 exits the BEF 60 from the prismatic pattern. The prismatic pattern 61 includes two light collecting facets 61a and 61b as depicted in the FIG. 3. In one exemplary embodiment of the present invention, an angle θ between the light collecting facets 61a and 61b may be about 90°. When the BEF 60 comprises the prismatic pattern 61 that has the light collecting facets 61a and 61b separated by an angle θ of about 90°, the BEF 60 may be advantageously employed in an LCD device that has an LGP and a lamp. As noted above, the lamp generates a light into a side of the LGP. In another exemplary embodiment of the present invention, an angle θ between the light collecting facets 61a and 61b may be in a range of about 90° to about 130°. When the BEF 60 comprises the prismatic pattern 61 that has the light collecting facets 61a and 61b separated at an angle θ of about 90° to about 130°, the BEF 60 may be advantageously employed in an LCD device that has a display panel and a plurality of lamps disposed in parallel. The lamps are disposed on one a side of the display panel.

To prevent the Moire Effect generated by superimposing the prismatic pattern 61 upon pixel electrodes of a display device or signal lines of the display device, the prismatic pattern 61 of the BEF 60 may be tilted relative to the pixel electrodes or the signal lines by an angle of about 22.5°.

The adhesion member 20 includes a first adhesion layer 22 and a second adhesion layer 24. The first adhesion layer 22 is disposed between the diffusing plate 30 and the DBEF 50, and the second adhesion layer 24 is disposed between the DBEF 50 and the BEF 60. Each of the first and the second adhesion layers 22 and 24 is transparent to light and can be adhesively coupled to the diffusing plate 30 and the DBEF 50 with an effective adhesive strength. In addition, the first and the second adhesion layers 22 and 24 do not generate bubbles when they encounter heat. In one embodiment, the materials used in each of the first and the second adhesion layers 22 and 24 may have a refractive index of about 1.0 to about 2.0, and a secondary glass transition temperature of about 70° C. to about −40° C. In an exemplary embodiment of the present invention, the first and the second adhesion layers 22 and 24 may include adhesive materials or adhesive sheets, respectively. For example, each of the first and the second adhesion layers 22 and 24 includes an adhesive sheet for a transparent plate such as "Clear Fit" (trade name manufactured by Mitsubishi Co. in Japan).

The first adhesion layer 22 is used to bond the diffusing plate 30 to the DBEF 50, while the second adhesion layer 24 is used to bond the DBEF 50 to the BEF 60.

When the optical module 300 includes the diffusing plate 30, the DBEF 50, the BEF 60 and the two adhesion layers 22 and 24, the optical module 300 may be advantageously employed in an LCD device so that the LCD device including the optical module 300 may have a greatly reduced volume and weight.

Figure 4:
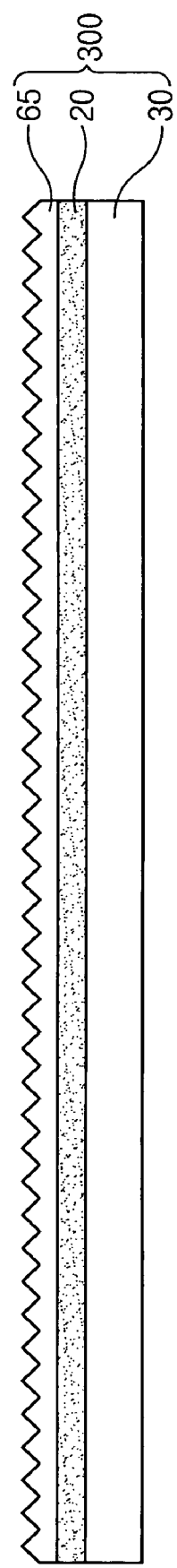
FIG. 4 is an exemplary cross-sectional view illustrating an optical module in accordance with the present invention.

FIG. 4 is an exemplary cross-sectional view illustrating an optical module in accordance with the present invention. In FIG. 4, an optical module 300 has a construction substantially identical with that of the optical module 300 in FIG. 1 except for the presence of a BEF-RP 65.

Referring to FIG. 4, the optical module 300 includes a diffusing plate 30, an adhesion member 20, and the BEF-RP 65.

The diffusing plate 30 diffuses a light incident into the optical module 300 to improve the uniformity of luminance. Examples of a material that can be used for the diffusing plate 30 are polycarbonate, polysulfonate, polystyrene, polyvinyl chloride, polyvinyl alcohol, polynorbornene, polyester, PET, PEN, or the like. These can be used alone or in combinations thereof. The diffusing plate 30 may further include a diffusing agent for effectively diffusing the light incident on the optical module 300. Alternatively, the diffusing plate 30 may further include a plurality of stacked diffusing films.

The BEF-RP 65 (manufactured by 3M Co.) simultaneously functions as a BEF and a DBEF. The BEF-RP 65 further improves the luminance of the light diffused by the diffusing plate 30.

The adhesion member 20 is attached to the diffusing plate 30 and the BEF-RP 65. That is, the diffusing plate 30 is attached to one side of the adhesion member 20, while the BEF-RP 65 is attached to the other side of the adhesion member 20.

The adhesion member 20 is transparent to light and can be adhesively coupled to the diffusing plate 30 and the BEF-RP 65 with an effective adhesive strength. In addition, the adhesion member 20 may not generate bubbles when it encounters heat. The materials used in the adhesion member 20 may have a refractive index of about 1.0 to about 2.0, and a secondary glass transition temperature of about 70° C. to about −40° C. In an exemplary embodiment of the present invention, the adhesion member 20 may include an adhesive material or an adhesive sheet. For example, the adhesion member 20 includes an adhesive sheet for a transparent plate such as "Clear Fit" (trade name manufactured by Mitsubishi Co. in Japan).

The adhesion member 20 may reduce a stress generated by contractions and expansions of the diffusing plate 30 and the BEF-RP 65 so that the diffusing plate 30 and the BEF-RP 65 may not be separated from each other. In an exemplary embodiment, the adhesion member 20 has a thermal coefficient of expansion that is about the same as that of the BEF-RP 65. Since the adhesion member 20 is bonded to the diffusing plate 30 and the BEF-RP 65, the diffusing plate and the BEF-RP 65 cannot be easily separated from each other due to moisture and/or heat. The presence of the adhesion member 20 disposed between the diffusing plate 30 and the BEF-RP 65 will prevent bending of the diffusing plate 30 and the BEF-RP 65.

Figure 5:
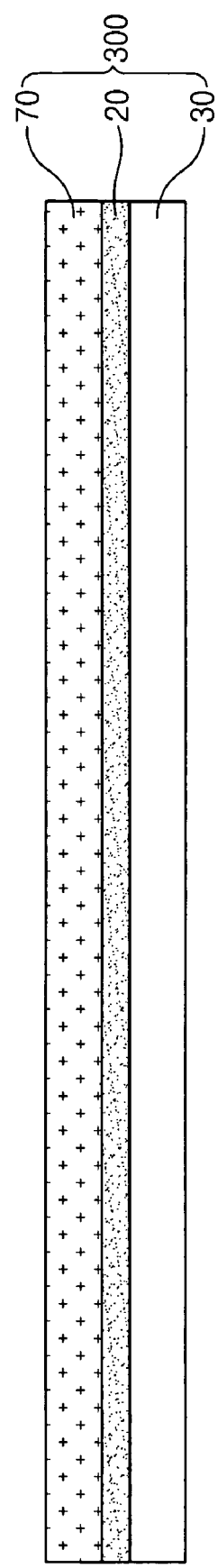
FIG. 5 is an exemplary cross-sectional view illustrating an optical module in accordance with the present invention.
Figure 6:
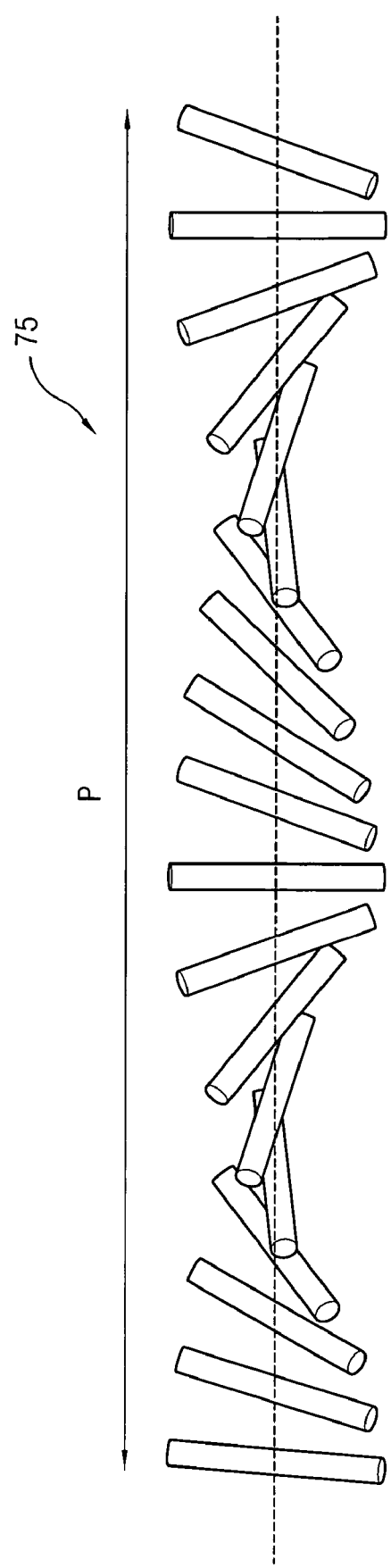
FIG. 6 is an exemplary schematic perspective view illustrating the molecular structure of the cholesteric liquid crystals comprised in a CLCF of the optical module of FIG. 5.

FIG. 5 is an exemplary cross-sectional view illustrating an optical module in accordance with the present invention. FIG. 6 is a schematic perspective view illustrating a molecular structure of a cholesteric liquid crystal included in a CLCF of the optical module in FIG. 5. In FIG. 5, an optical module 300 has a construction substantially identical with that of the optical module 300 in FIG. 1 except for the presence of a CLCF 70.

Referring to FIGS. 5 and 6, the optical module 300 comprises a diffusing plate 30, an adhesion member 20, and the CLCF 70.

The diffusing plate 30 diffuses a light incident into the optical module 300 to improve the uniformity of luminance. Examples of a material that can be used for the diffusing plate 30 may include polycarbonate, polysulfonate, polystyrene, polyvinyl chloride, polyvinyl alcohol, polynorbornene, polyester, PET, PEN, or the like. These can be used alone or in combinations thereof. The diffusing plate 30 may further include a diffusing agent for effectively diffusing the light incident on the optical module 300. Alternatively, the diffusing plate 30 may further include a plurality of stacked diffusing films.

The CLCF 70 includes a cholesteric liquid crystal 75. The cholesteric liquid crystal 75 includes liquid crystal molecules having bar-like shapes. The liquid crystal molecules are spirally twisted. The liquid crystal molecules in the cholesteric liquid crystal 75 have repeating twists present. The repeating twists of the liquid crystal molecules are separated by a predetermined interval. This periodic interval of the liquid crystal molecules is termed the pitch (P). A light incident on the cholesteric liquid crystal 75 may be reflected by Bragg reflection because of the pitch of the liquid crystal molecules.

When a chiral axis of the cholesteric liquid crystal 75 is arranged to be perpendicular to the surface of the CLCF 70, light having a wavelength corresponding to the pitch (P) of the cholesteric liquid crystal 75 is reflected from the CLCF 70, whereas light having a wavelength different from the pitch (P) of the cholesteric liquid crystal 75 is transmitted through the CLCF 70 and is not reflected. Thus, when a cholesteric liquid crystal layer has an appropriate thickness, about 50 percent of the light incident on the cholesteric liquid crystal layer is reflected from the cholesteric liquid crystal layer while about 50 percent of the light incident on the cholesteric liquid crystal layer is transmitted through the cholesteric liquid crystal layer. For example, when the cholesteric liquid crystal layer has a thickness of about ten times the pitch (P) of the cholesteric liquid crystal 75, about 50 percent of the light incident into the cholesteric liquid crystal layer may be reflected from the cholesteric liquid crystal layer.

When the liquid crystal molecules in the cholesteric liquid crystal 75 are twisted in a right-hand direction, the light reflected from the cholesteric liquid crystal 75 corresponds to right handed circular polarized light. On the other hand, when the light reflected from the cholesteric liquid crystal 75 corresponds to left handed circular polarized light, the liquid crystal molecules in the cholesteric liquid crystal 75 are twisted in a left-hand direction. The light that is transmitted through the cholesteric liquid crystal 75 has a polarization that is opposed to that of the light reflected from the cholesteric liquid crystal 75.

In one embodiment, when the light reflected from the cholesteric liquid crystal layer corresponds to left handed circular polarized light, the light passing through the cholesteric liquid crystal layer corresponds to right handed circular polarized light. The left handed circular polarized light may be recycled to convert the light into right handed circular polarized light so that all of the light incident on the CLCF 70 may be transmitted through the CLCF 70. Thus in one embodiment, because of the cholesteric liquid crystal layer, all of the light incident into the CLCF 70 may be converted into polarized light having a single plane of polarization.

To convert right handed circular polarized light or left handed circular polarized light into polarized light having a single plane of polarization, the CLCF 70 may further include a retardation plate formed on the cholesteric liquid crystal 75.

In a manufacturing process for the CLCF 70 according to one exemplary embodiment of the present invention, the cholesteric liquid crystal is mixed with vertically aligned liquid crystal in a weight ratio of about 8:2 to thereby form a first liquid crystal mixture. An ultraviolet ray initiator is added to the first liquid crystal mixture in an amount of about 5 weight percent based on the entire weight of the first liquid crystal mixture. The mixture of the first liquid crystal mixture and the ultraviolet ray initiator is termed a first mixture. The first mixture is then dissolved in a solution such as toluene. Here, the first mixture is completely dissolved in the solution by agitating the mixture at a temperature of about 80° C. to about 90° C. for about 30 minutes.

In the manufacturing process for the CLCF 70 according to another exemplary embodiment of the present invention, a cholesteric liquid crystal is mixed with a vertically aligned liquid crystal by a weight ratio of about 6:4 to thereby form a second liquid crystal mixture. An ultraviolet ray initiator is added to the second liquid crystal mixture in an amount of about 5 weight percent based on the entire weight of the second liquid crystal mixture. The mixture of the second liquid crystal mixture and the ultraviolet ray initiator is termed a second mixture. The second mixture is then dissolved in a solution such as toluene. Here, the second mixture is completely dissolved in the solution by agitating the mixture at a temperature of about 80° C. to about 90° C. for about 30 minutes.

In a manufacturing process for the CLCF 70 according to yet another exemplary embodiment of the present invention, a cholesteric liquid crystal is mixed with a vertically aligned liquid crystal in a weight ratio of about 7:3 to thereby form a third liquid crystal mixture. An ultraviolet ray initiator is added to the third liquid crystal mixture in an amount of about 5 weight percent based on the entire weight of the third liquid crystal mixture. This mixture of the third liquid crystal mixture and the ultraviolet ray initiator is called the third mixture. The third mixture is also dissolved in a solution such as toluene. Here, the third mixture is completely dissolved in the solution by agitating the mixture at a temperature of about 80° C. to about 90° C. for about 30 minutes.

The solutions including the first to third mixtures are coated on first to third base films, respectively. The first to third coated base films are stacked in series, and are attached to one another. Then, a retardation plate is attached to the third coated base film so that the CLCF 70 is completed. An additional diffusing plate may be disposed on the CLCF 70 besides the diffusing plate 30.

The adhesion member 20 is attached to the diffusing plate 30 and the CLCF 70. The diffusing plate 30 is attached to one side of the adhesion member 20, while the CLCF 70 is attached to the other side of the adhesion member 20. The adhesion member 20 is transparent to light and can be adhesively coupled to the diffusing plate 30 and the CLCF 70 with an effective adhesive strength. In addition, the adhesion member 20 may not generate bubbles when it encounters heat. The materials used in the adhesion member 20 may have a refractive index of about 1.0 to about 2.0, and a secondary glass transition temperature of about 70° C. to about −40° C. In an exemplary embodiment of the present invention, the adhesion member 20 may include an adhesive material or an adhesive sheet. For example, the adhesion member 20 includes an adhesive sheet for a transparent plate such as "Clear Fit" (trade name manufactured by Mitsubishi Co. in Japan).

The adhesion member 20 may reduce a stress generated by contractions and expansions of the diffusing plate 30 and the CLCF 70 so that the diffusing plate 30 and the CLCF 70 may not be separated from each other. In one embodiment, the adhesion member 20, the diffusing plate 30 and the CLCF 70 have similar thermal expansion coefficients so that they can undergo expansions and/or contractions without separating from each other. In addition, the adhesion member 20 may prevent the diffusing plate 30 and the CLCF 70 from bending.

Figure 7:
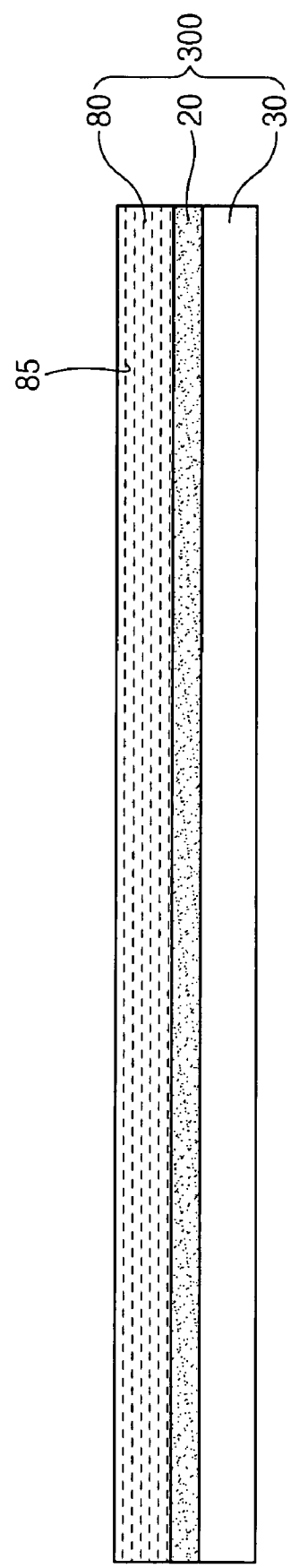
FIG. 7 is an exemplary cross-sectional view illustrating an optical module in accordance with the present invention.

FIG. 7 is an exemplary cross-sectional view illustrating an optical module in accordance with the present invention. In FIG. 7, an optical module 300 has a construction substantially identical with that of the optical module 300 in FIG. 1 except for the presence of a DRPF 80.

Referring to FIG. 7, the optical module 300 includes a diffusing plate 30, an adhesion member 20 and the DRPF 80.

The diffusing plate 30 diffuses a light incident on the optical module 300 to improve the uniformity of luminance. Examples of a material that can be used for the diffusing plate 30 may include polycarbonate, polysulfonate, polystyrene, polyvinyl chloride, polyvinyl alcohol, polynorbornene, polyester, PET, PEN, or the like. These can be used alone or in combinations thereof. The diffusing plate 30 may further include a diffusing agent for effectively diffusing the light incident on the optical module 300. Alternatively, the diffusing plate 30 may further include a plurality of stacked diffusing films.

The DRPF 80 includes organic particles 85 contained in a polymer film. An initial polymer film may be subjected to extension along a selected direction to form the polymer film. The polymer film has a length of about 1.1 to about 8 times greater than that of the initial polymer film. Examples of materials that can be used for the polymer film comprise polycarbonate, PET, polyimide, polysulfonate, polymethyl methacrylate, polystyrene, polyvinyl chloride, polyvinyl alcohol, polynorbornene, a derivative thereof, or a copolymer thereof. These can be used alone or in combinations thereof.

The organic particles 85 may have core-shell structures and comprise metacrylate butadiene styrene (MBS). Here, the cross-linked portion of butadiene styrene may serve as a core, while polymethyl methacrylate (PMMA) enclosing the core may serve as a shell. That is, butadiene and styrene are linked together as a mesh structure, and PMMA encloses the mesh structure of butadiene and styrene.

Since the polymer film of the DRPF 80 is subjected to extension as described above, a refractive index difference may be generated between the extended portion of the polymer film and the unextended portion of the polymer film, thereby causing a reflection of the polarized light. For example, because of the presence of the organic particles 85 at the extended portion of the polymer film, a P-wave of the light incident to the DRPF 80 passes through the DRPF 80, whereas an S-wave of the light is reflected from the DRPF 80. That is, since the light generated from a lamp includes P-waves and S-waves, the organic particles 85 at the extended portion of the polymer film permits the P-wave of the light having a wavelength of about 250 to about 800 nm to pass through the DRPF 80, while the S-waves of light are reflected from the DRPF 80.

The S-waves of the light that are reflected from the DRPF 80 are reflected again from a reflection plate of a display device so that some portions of the S-waves are converted into P-waves while other portions of the S-wave are maintained as S-waves. With this reflection of the S-wave between the DRPF 80 and the reflection plate, the P-waves of the light increase whereas the S-wave of the light decrease. As a result, the luminance of the light passing through the DRPF 80 may be greatly augmented.

The DRPF 80 has a thickness that is substantially thinner than that of the DBEF 50. In addition, the DRPF 80 may be easily manufactured in comparison with the DBEF 50.

In a manufacturing process for forming the DRPF 80, a polymer resin is melt blended with organic particles 85 having the core-shell structures. Examples of the polymer resin include polycarbonate, PET, polyimide, polysulfonate, polymethyl methacrylate, polystyrene, polyvinyl chloride, polyvinyl alcohol, polynorbornene, a derivative thereof, or a copolymer thereof. These polymer resins can be used alone or in combinations thereof. The organic particles 85 may comprise MBS.

The melted polymer resin and the melted organic particles 85 that are melt blended are cooled using a cooling roller to form a polymer film that comprises the organic particles 85. The polymer film is then subjected to extension in a selected direction while applying heat to the polymer film.

The adhesion member 20 is attached to the diffusing plate 30 and the DRPF 80. The diffusing plate 30 is attached to one side of the adhesion member 20, while the DRPF 80 is attached to the other side of the adhesion member 20.

The adhesion member 20 is transparent to light and can be adhesively coupled to the diffusing plate 30 and the DRPF 80 with an effective adhesive strength. In addition, the adhesion member 20 may not generate bubbles when it encounters heat. The materials used in the adhesion member 20 may have a refractive index of about 1.0 to about 2.0, and a secondary glass transition temperature of about 70° C. to about −40° C. In an exemplary embodiment of the present invention, the adhesion member 20 may include an adhesive material or an adhesive sheet. For example, the adhesion member 20 includes an adhesive sheet for a transparent plate such as "Clear Fit" (trade name manufactured by Mitsubishi Co. in Japan).

The adhesion member 20 may reduce the stress generated by contractions and expansions of the diffusing plate 30 and the DRPF 80 so that the diffusing plate 30 and the DRPF 80 may not be separated from each other. In one embodiment, the adhesion member 20, the diffusing plate 30 and the DRPF 80 have similar thermal expansion coefficients so that they can undergo expansions and/or contractions without separating from each other. Additionally, the diffusing plate 30 and the DRPF 80 will be preventing from bending due to the presence of the adhesion member 20 disposed between the diffusing plate 30 and the DRPF 80.

Figure 8:
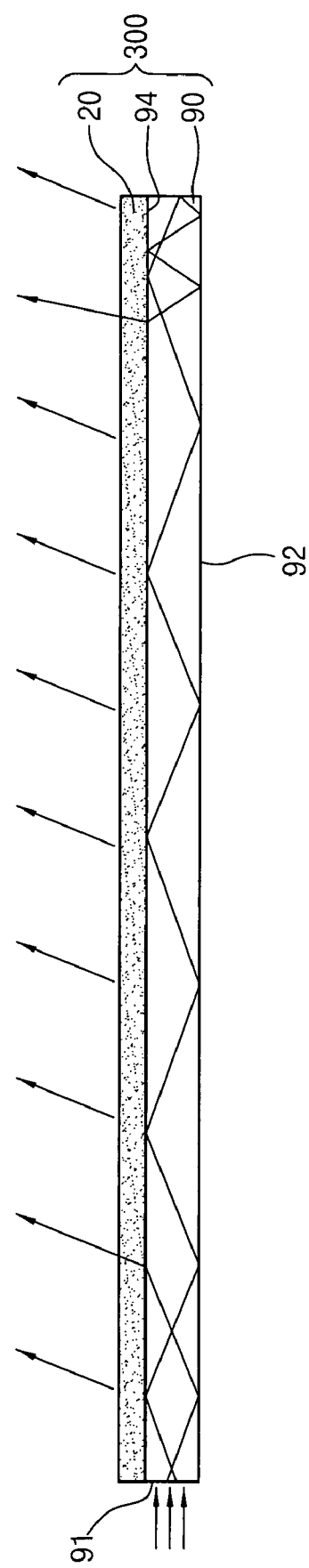
FIG. 8 is an exemplary cross-sectional view illustrating an optical module in accordance with the present invention.

FIG. 8 is an exemplary cross-sectional view illustrating an optical module in accordance with the present invention.

Referring to FIG. 8, the optical module 300 includes an adhesion member 20 and an LGP 90.

The LGP 90 includes a first facet 92, a second facet 94 and four side facets 91. The LGP 90 may have a rectangular plate-like shape. As shown in the FIG. 8, the light is incident into at least one side facet 91. The incident light through the at least one facet 91 is reflected from the first facet 92 and/or the second facet 94, and then the reflected light exits through the second facet 94. To emit most of the light through from the second facet 94, reflection dots having high reflectivity may be formed at the first facet 92.

The adhesion member 20 is attached to the LGP 90. In particular, the adhesion member 20 is disposed on the second facet 94 where the light is emitted. The adhesion member 20 is transparent to light and functions effectively in adhesive applications. In addition, the adhesion member 20 may not generate bubbles when it encounters heat. The materials used in the adhesion member 20 may have a refractive index of about 1.0 to about 2.0, and a secondary glass transition temperature of about 70° C. to about −40° C. In an exemplary embodiment of the present invention, the adhesion member 20 may include an adhesive material or an adhesive sheet. For example, the adhesion member 20 includes an adhesive sheet for a transparent plate such as "Clear Fit" (trade name manufactured by Mitsubishi Co. in Japan).

The adhesion member 20 may reduce a stress generated by a contraction and an expansion of the LGP 90 so that the adhesion member 20 may prevent the bending of the LGP 90.

An optical member including a diffusing sheet or a BEF may be attached to the adhesion member 20 disposed on the LGP 90.

Figure 9:
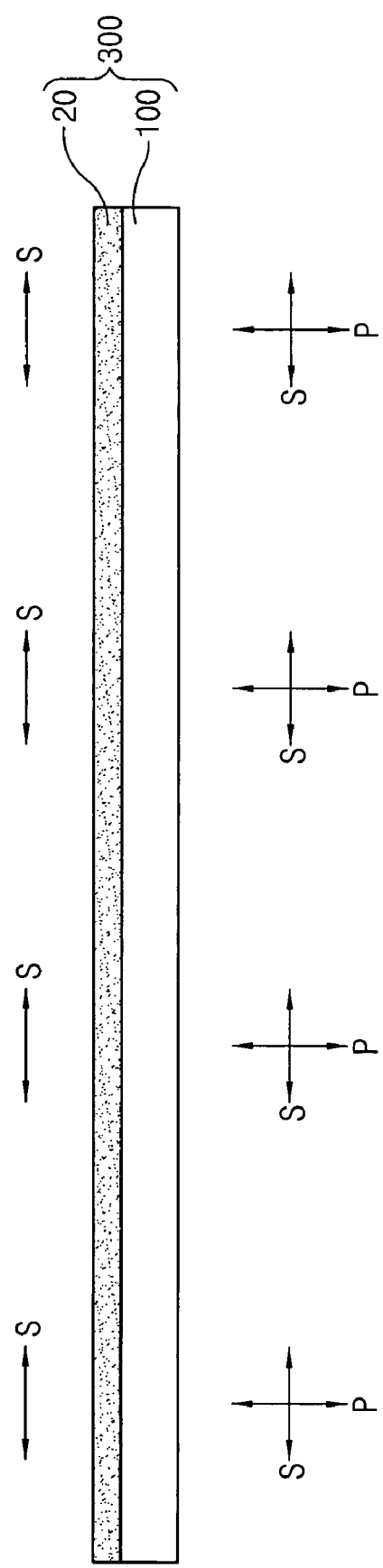
FIG. 9 is an exemplary cross-sectional view illustrating an optical module in accordance with the present invention.

FIG. 9 is an exemplary cross-sectional view illustrating an optical module in accordance with the present invention.

Referring to FIG. 9, the optical module 300 includes a polarizing plate 100 and an adhesion member 20.

The polarizing plate 100 polarizes P-waves of a light generated from a light source while transmitting S-waves of light. For example, the polarizing plate 100 absorbs the P-waves of the light, while transmitting the S-waves of the light. A pair of the polarizing plates 100 may be disposed on a display panel of a display device. Here, the polarizing plates 100 may be disposed in perpendicular to the display panel.

The adhesion member 20 is attached to the polarizing plate 100. The adhesion member 20 may be integrally formed with the polarizing plate 100. The adhesion member 20 is transparent to light and can be adhesively coupled to the diffusing plate 30 and the BEF-RP 65 with an effective adhesive strength. In addition, the adhesion member 20 may not generate bubbles when it encounters heat. The materials used in the adhesion member 20 may have a refractive index of about 1.0 to about 2.0, and a secondary glass transition temperature of about 70° C. to about −40° C. In an exemplary embodiment of the present invention, the adhesion member 20 may include an adhesive material or an adhesive sheet. For example, the adhesion member 20 includes an adhesive sheet for a transparent plate such as "Clear Fit" (trade name manufactured by Mitsubishi Co. in Japan).

The adhesion member 20 may reduce a stress generated by a contraction and an expansion of the polarizing plates 100 so that the adhesion member 20 may prevent the polarizing plates 100 from bending.

The display panel may be attached to the adhesion member 20. Various optical sheets may be further disposed on the adhesion member 20.

Figure 10:
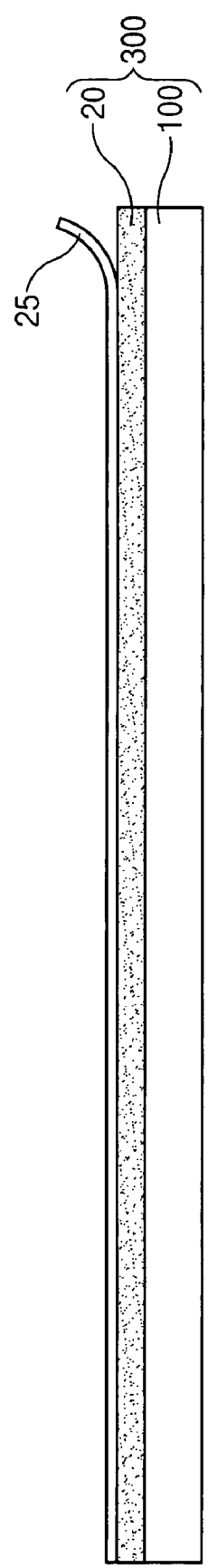
FIG. 10 is an exemplary cross-sectional view illustrating an optical module in accordance with the present invention.

FIG. 10 is an exemplary cross-sectional view illustrating an optical module in accordance with the present invention. In FIG. 10, an optical module 300 has a construction substantially identical to that of the optical module 300 in FIG. 9 except for a detachable sheet 25.

Referring to FIG. 10, the optical module 300 includes a polarizing plate 100, an adhesion member 20 and the detachable sheet 25.

The detachable sheet 25 is disposed on the adhesion member 20. The detachable sheet 25 may prevent the adhesion member 20 from being attached to other elements of a display device after the adhesion member 20 is attached to the polarizing plate 100.

The detachable sheet 25 is removed from the adhesion member 20 when another element of the display device such as an optical sheet is attached to the adhesion member 20.

Method of Forming an Optical Module

FIGS. 11 to 14 are exemplary cross-sectional views illustrating a method of forming an optical module in accordance with of the present invention.

Figure 11:
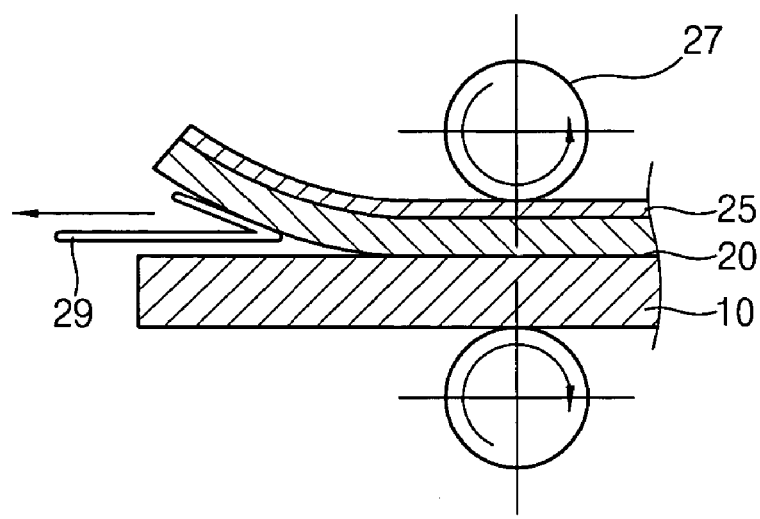
FIGS. 11 to 14 are exemplary cross-sectional views illustrating a method of forming an optical module in accordance with the present invention.

Referring to FIG. 11, a first optical member 10 is prepared. The first optical member 10 may have various constructions as described above. For example, the first optical member 10 includes a diffusing plate, a BEF, a diffusing sheet, a DBEF, a CLCF, a DRPF, a retardation plate, an LGP, a light reflector, a polarizing plate or a protective film. The first optical member 10 may improve characteristics of an incident light such as the luminance of the light, the uniformity of luminance, the polarization of the light, or the like. The first optical member 10 may have a first modulus of elasticity.

A transparent adhesion member 20 is attached to the first optical member 10. Here, a first detachable sheet 29 and a second detachable sheet 25 are disposed on both sides of the adhesion member 20. The adhesion member 20 may have a second modulus of elasticity. The second modulus of elasticity of the adhesion member 20 may be substantially identical to the first modulus of elasticity of the first optical member 10. Since the first optical member 10 has the first modulus of elasticity substantially identical to the second modulus of elasticity of the adhesion member 20, the adhesion member 20 may prevent the first optical member 10 from undergoing bending.

After the first detachable sheet 29 is partially removed from the adhesion member 20, the adhesion member 20 and the first optical member 10 are disposed between a pair of pressing rollers 27.

Figure 12:
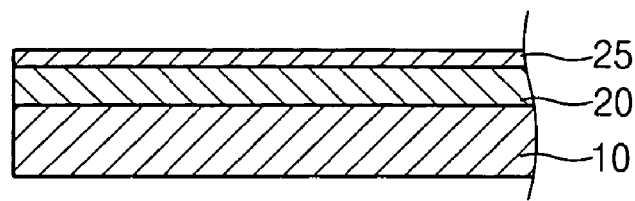

Referring to FIG. 12, while the first detachable sheet 29 is removed from the adhesion member 20, the adhesion member 20 and the first optical member 10 are pressed by the pressing rollers 27, thereby attaching the adhesion member 20 to the first optical member 10. The adhesion member 20 is combined with the first optical member 10 at room temperature. As noted above, the adhesion member 20 may not generate any bubbles when heated during a manufacturing process. Thus, the first optical member 10 is attached to the adhesion member 20 without generation of bubbles between the first optical member 10 and the adhesion member 20.

Figure 13:
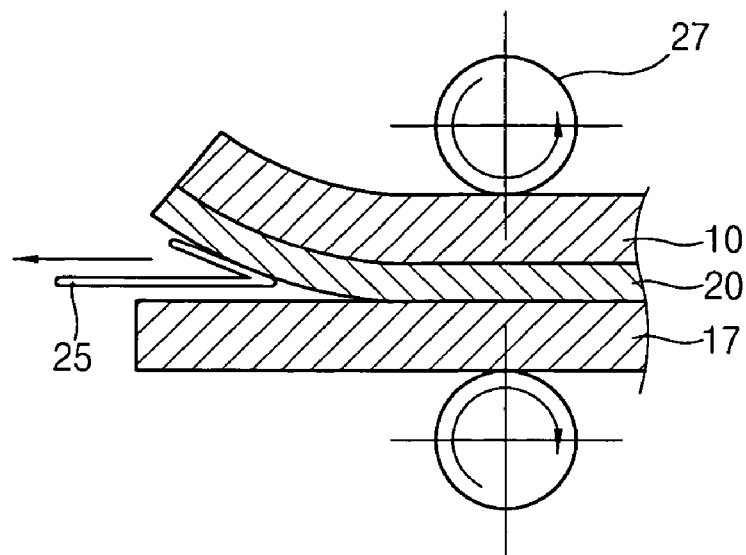

Referring to FIG. 13, a second optical member 17 is disposed on the adhesion member 20 after the first optical member 10 is coupled to the adhesion member 20. The second optical member 17 may include a diffusing plate, a BEF, a diffusing sheet, a DBEF, a CLCF, a DRPF, a retardation plate, an LGP, a light reflector, a polarizing plate or a protective film. The second optical member 17 may also improve the characteristics of the incident light such as the luminance of the light, the uniformity of luminance, the polarization of the light, or the like. The second optical member 17 may have a third modulus of elasticity substantially identical to the first modulus of elasticity of the first optical member 10.

Figure 14:
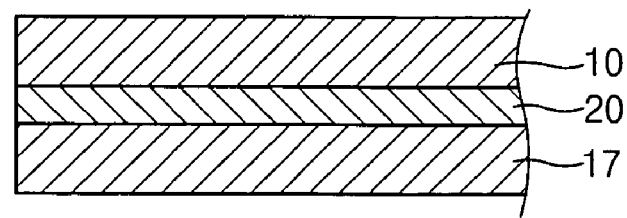

After the second detachable sheet 25 is partially removed from the adhesion member 20, the second optical member 17 and the adhesion member 20 are pressed between the pressing rollers 27 while the first optical member 10 is combined with the adhesion member 20. The second optical member 17 is attached to the adhesion member 20 by the pressing rollers 27 while removing the second detachable sheet 17 from the adhesion member 20. As a result, the second optical member 17 is combined with the first optical member 10 by interposing the adhesion member 20 as shown in FIG. 14.

Backlight Assembly

Figure 15:
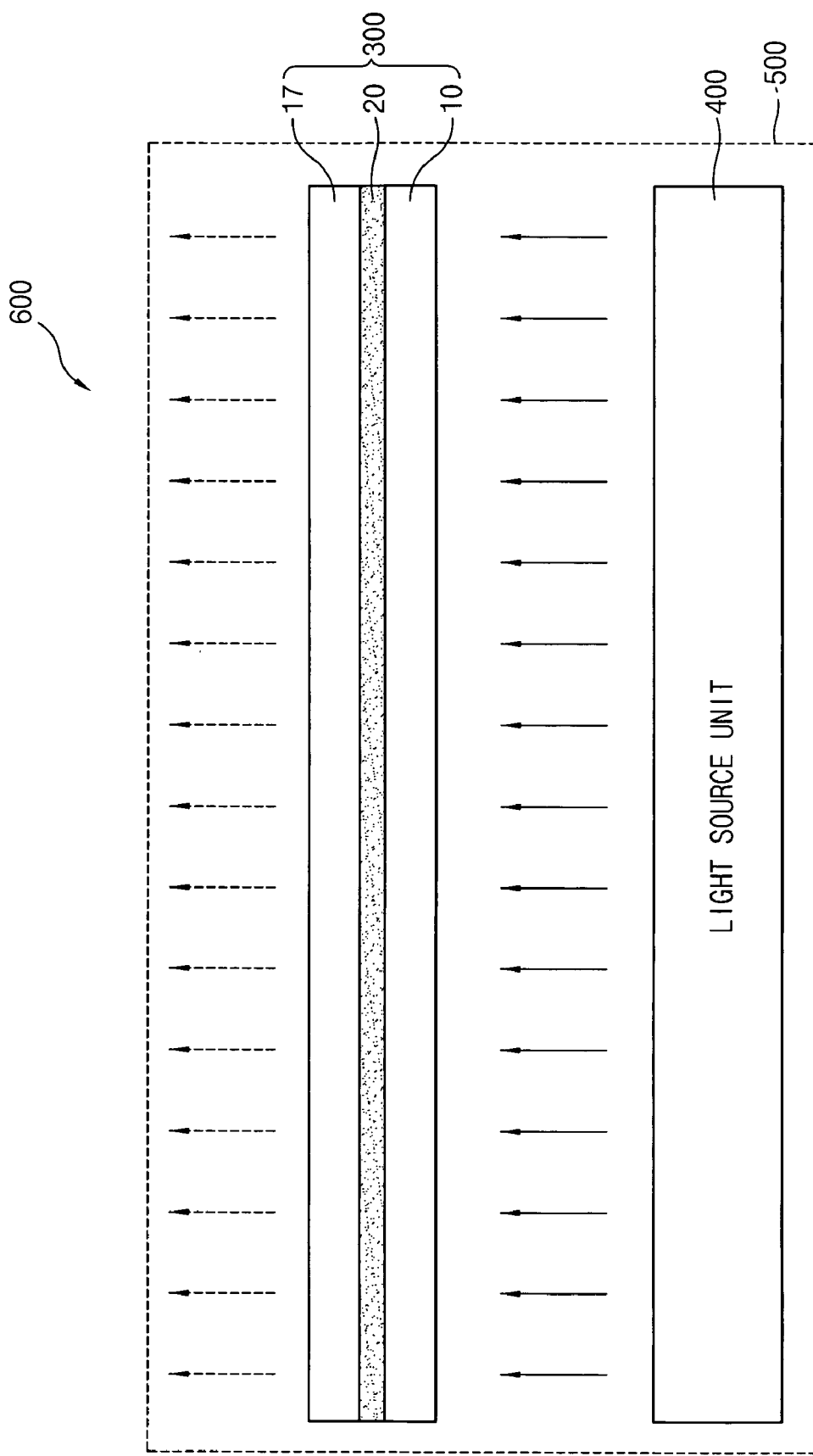
FIG. 15 is an exemplary cross-sectional view illustrating a backlight assembly in accordance with the present invention.

FIG. 15 is an exemplary cross-sectional view illustrating a backlight assembly in accordance with the present invention. In FIG. 15, an optical module 300 of a backlight assembly 600 has a construction substantially identical with that of the optical module described with reference to FIGS. 11 to 14. That is, the optical module 300 includes a first optical member 10, an adhesion member 20 and a second optical member 17.

Referring to FIG. 15, the backlight assembly 600 comprises the optical module 300, a light source unit 400 and a container 500.

The light source unit 400 includes a light source for generating a light that is directed towards the optical module 300. The container 500 receives the light source unit 400 and the optical module 300, and then fixes the light source unit 400 and the optical module 300 at predetermined positions thereof.

Figure 16:
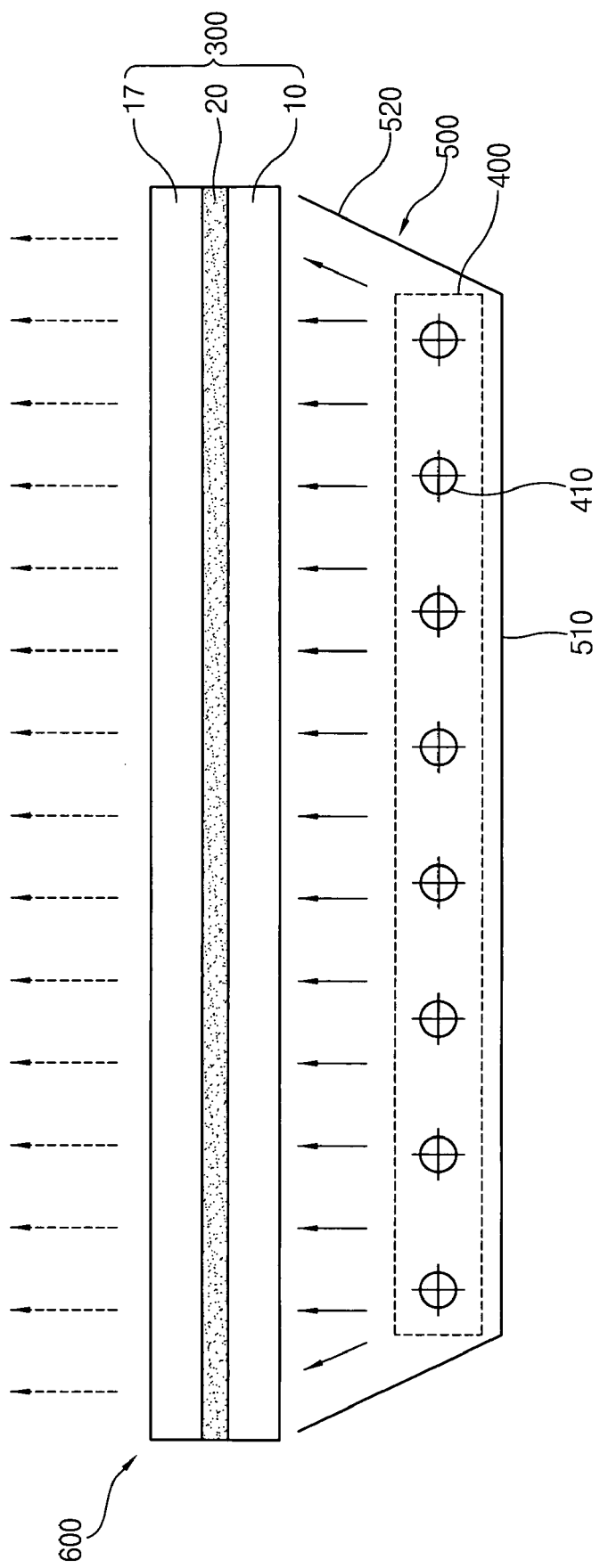
FIG. 16 is an exemplary cross-sectional view illustrating a backlight assembly in accordance with the present invention.

FIG. 16 is an exemplary cross-sectional view illustrating a backlight assembly in accordance with the present invention. In FIG. 16, a backlight assembly 600 has a construction substantially identical with that of the backlight assembly 600 in FIG. 15 except for the light source unit 400 and the container 500.

Referring to FIG. 16, the backlight assembly 600 includes the optical module 300, a light source unit 400 and a container 500.

The container 500 has a bottom face 510 and sidewalls 520 extended from edge portions of the bottom face 510. The bottom face 510 of the container 500 may have a rectangular plate shape. The container 500 may include a metal having a good thermal conductivity.

The optical module 300 is positioned over the bottom face 510 of the container 500. The optical module 300 may be fixed to the sidewalls 520 of the container 500.

The light source unit 400 is disposed between the optical module 300 and the bottom face 510 of the container 500. The light source unit 400 includes light sources that generate a light and provides the light to the optical module 300. The light source unit 400 may include a plurality of the light sources disposed on the bottom face 510 of the container 500. Each of the light sources may have constructions extended along a first direction, and the light sources are arranged in parallel along a second direction. Here, the first direction may be substantially perpendicular to the second direction.

The light source unit 400 simultaneously generates light along with heat. The light and the heat generated from the light source unit 400 are transmitted to the optical module 300 including the first optical module 10, an adhesion member 20 and the second optical module 17. The first and the second optical modules 10 and 17 are thermally expanded by the heat generated from the light source unit 400. When the first optical member 10 has a thermal expansion coefficient different from that of the second optical member 17, the first and the second optical members 10 and 17 may be bent (i.e., deformed) upwardly or downwardly. However, since the adhesion member 20 interposed between the first and the second optical members 10 and 17 may compensate for the difference in thermal coefficients between the first and the second optical members 10 and 17, the bending of the first and the second optical members 10 and 17 may be prevented. Additionally, the first and the second optical members 10 and 17 may not be separated from each other due to the adhesion member 20 positioned between the first and the second optical members 10 and 17.

Figure 17:
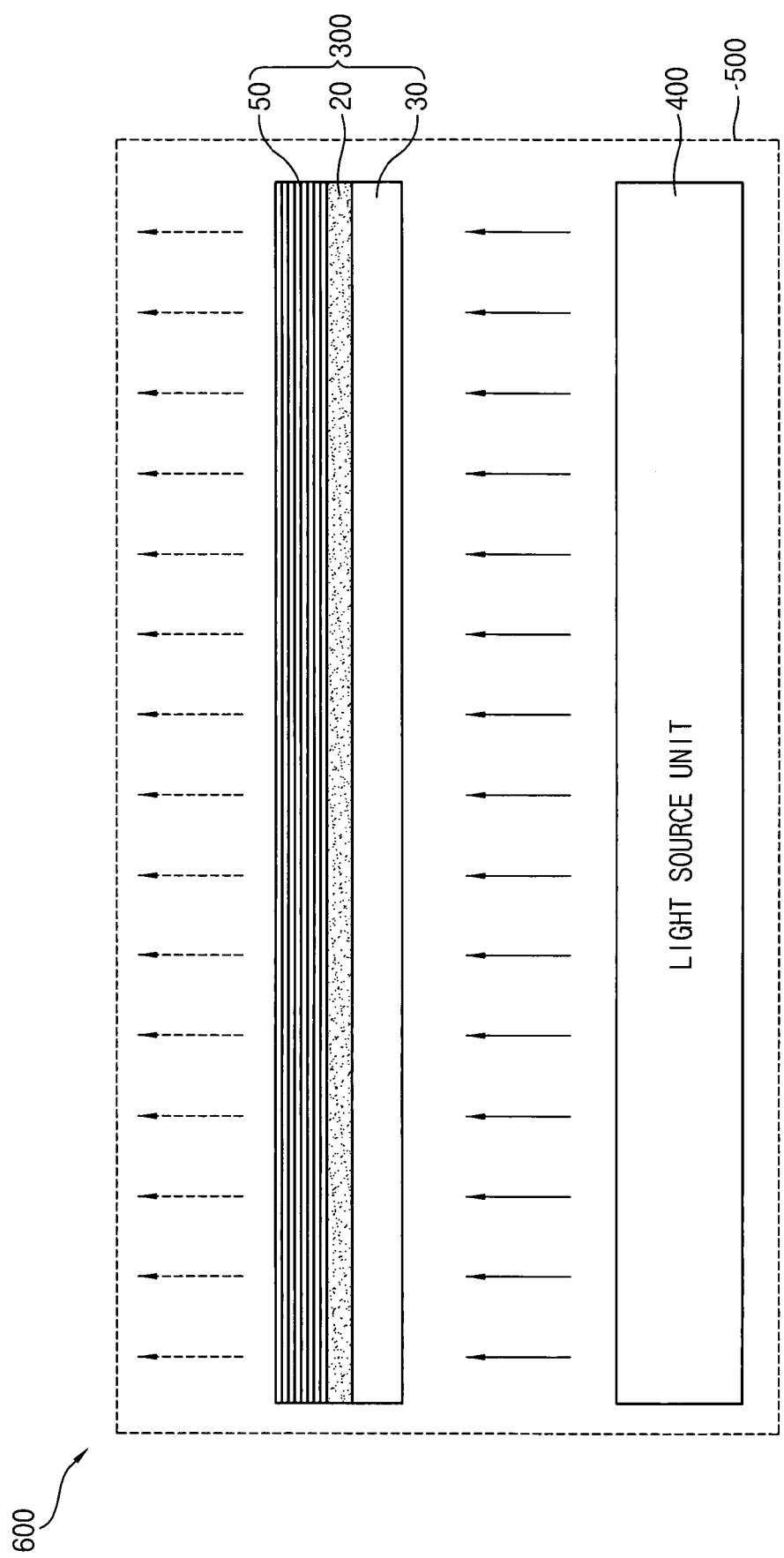
FIG. 17 is an exemplary cross-sectional view illustrating a backlight assembly in accordance with the present invention.

FIG. 17 is an exemplary cross-sectional view illustrating a backlight assembly in accordance with the present invention. In FIG. 17, a backlight assembly 600 has a construction substantially identical with that of the backlight assembly 600 in FIG. 15 except for the presence of the optical module 300.

Referring to FIG. 17, the backlight assembly 600 includes the optical module 300, a light source unit 400 and a container 500.

The optical module 300 includes a diffusing plate 30, an adhesion member 20 and a DBEF 50 as described with reference to FIG. 2.

The diffusing plate 30 diffuses the light generated from the light source unit 400 and is irradiated onto the optical module 300 to improve the uniformity of luminance. The DBEF 50 may particularly improve the luminance of images in a display device. The DBEF 50 may pass an S-wave of the light, and change a P-wave of the light into the S-wave of the light so that the luminance of the images displayed through the display device may be improved by increasing the entire amount of the light.

The adhesion member 20 is attached to the diffusing plate 30 and the DBEF 50. The adhesion member 20 may be integrally formed with the diffusing plate 30 and/or the DBEF 50. The diffusing plate 30 is attached to one side of the adhesion member 20, and the DBEF 50 is attached to the other side of the adhesion member 20.

The adhesion member 20 is transparent to light and can be adhesively coupled to the diffusing plate 30 and the BEF-RP 65 with an effective adhesive strength. In addition, the adhesion member 20 may not generate bubbles when it encounters heat. The materials used in the adhesion member 20 may have a refractive index of about 1.0 to about 2.0, and a secondary glass transition temperature of about 70° C. to about −40° C. In an exemplary embodiment of the present invention, the adhesion member 20 may include an adhesive material or an adhesive sheet. For example, the adhesion member 20 includes an adhesive sheet for a transparent plate such as "Clear Fit" (trade name manufactured by Mitsubishi Co. in Japan).

The adhesion member 20 is contracted or expanded corresponding to a contraction or an expansion of the diffusing plate 30. Additionally, the adhesion member 20 is contracted or expanded corresponding to a contraction or an expansion of the DBEF 50. The adhesion member 20 is contracted or expanded in accordance with the contractions and expansions of the diffusing plate 30 and the DBEF 50. In one embodiment, the coefficient of thermal expansion of the adhesion member 20 is the same as that of the diffusing plate 30 and the DBEF 50. In another embodiment, the coefficient of thermal expansion of the adhesion member 20 can compensate for differences in the coefficients of thermal expansion between the diffusing plate 30 and the DBEF 50. The diffusing plate 30 and the DBEF 50 are combined with each other by means of the adhesion member 20. Therefore, the diffusing plate 30 and the DBEF 50 may not be separated from each other due to moisture and/or heat.

When the optical module 300 includes the diffusing plate 30 and the DBEF 50 coupled by the adhesion member 20, the optical module 300 may be advantageously employed in the backlight assembly 600 for an LCD device. Thus, the LCD device including the backlight assembly 600 may have a greatly reduced volume and weight.

Figure 18:
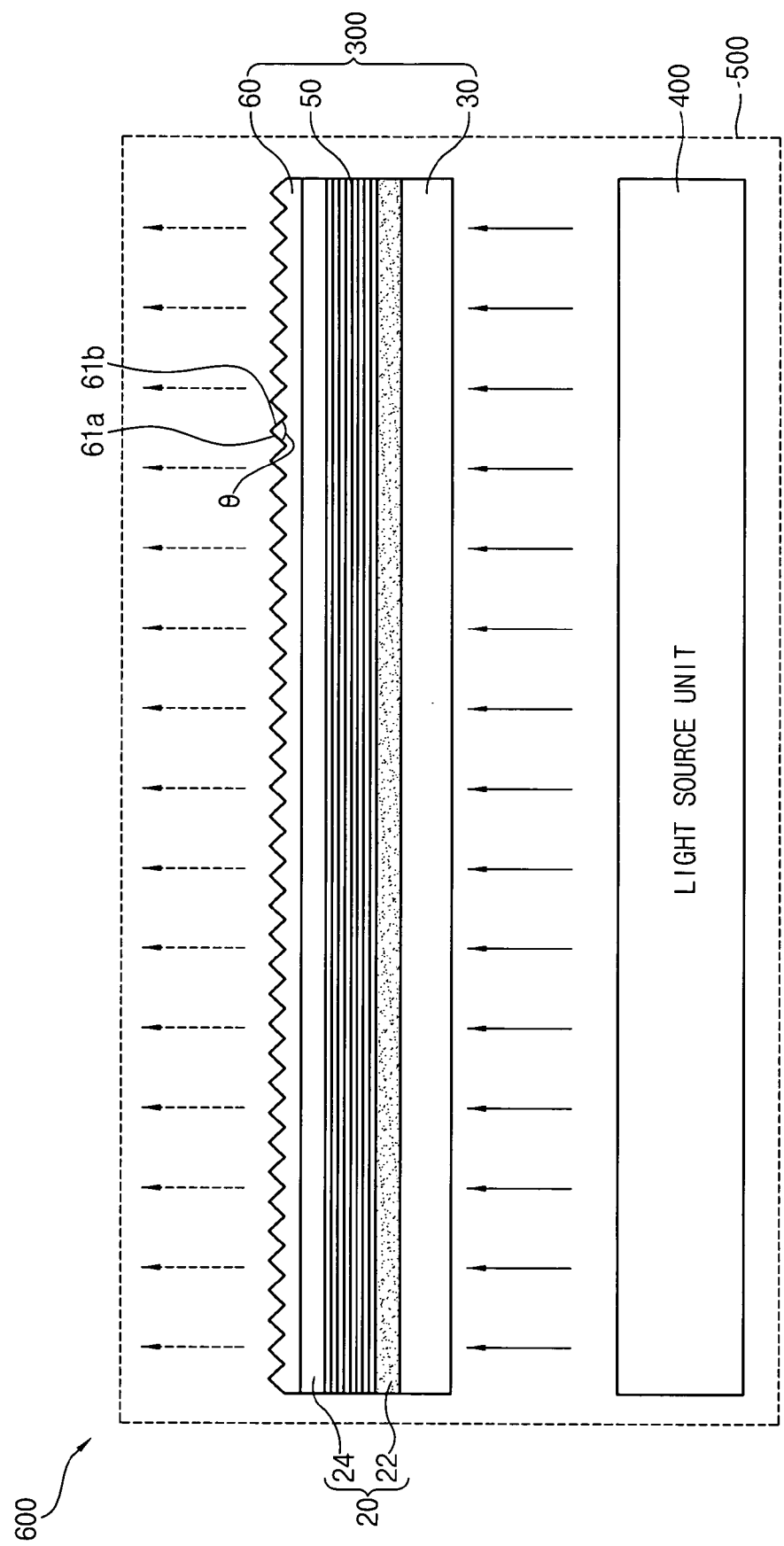
FIG. 18 is an exemplary cross-sectional view illustrating a backlight assembly in accordance with the present invention.

FIG. 18 is an exemplary cross-sectional view illustrating a backlight assembly in accordance with the present invention. In FIG. 18, a backlight assembly 600 has a construction substantially identical with that of the backlight assembly 600 in FIG. 15 except for the presence of the optical module 300.

Referring to FIG. 18, the backlight assembly 600 includes the optical module 300, a light source unit 400 and a container 500.

The optical module 300 includes a diffusing plate 30, an adhesion member 20 a DBEF 50, and a BEF 60 as described with reference to FIG. 3.

The diffusing plate 30 diffuses a light generated from the light source unit 400 and irradiated onto the optical module 300 to improve the uniformity of luminance. The DBEF 50 may particularly improve the luminance of images in a display device by partially polarizing the light passing through the diffusing plate 30.

The BEF 60 is disposed in a manner effective to face the DBEF 50. The BEF 60 may have a plate shape. The BEF 60 includes a prismatic pattern 61 on a face thereof where the light exits from the face. The prismatic pattern 61 includes two light collecting facets 61a and 61b. In one exemplary embodiment of the present invention, an angle θ between the light collecting facets 61a and 61b may be about 90°. When the BEF 60 includes the prismatic pattern 61 that has the light collecting facets 61a and 61b separated by the angle θ of about 90°, the BEF 60 may be advantageously employed in an LCD device that has an LGP and a lamp for providing a light into a side of the LGP. In another exemplary embodiment of the present invention, an angle θ between the light collecting facets 61a and 61b may be in a range of about 90° to about 130°. When the BEF 60 includes the prismatic pattern 61 that has the light collecting facets 61a and 61b separated by the angle θ of about 90° to about 130°, the BEF 60 may be advantageously employed in an LCD device that has a display panel and a plurality of lamps disposed in parallel under the display panel.

The adhesion member 20 includes a first adhesion layer 22 and a second adhesion layer 24. The first adhesion layer 22 is disposed between the diffusing plate 30 and the DBEF 50, and the second adhesion layer 24 is disposed between the DBEF 50 and the BEF 60. Each of the first and the second adhesion layers 22 and 24 is transparent and can adhesively bond with other surfaces that are brought into contact with it. The first and the second adhesion layers 22 and 24 may not generate bubbles when subjected to heating. Each of the first and the second adhesion layers 22 and 24 may have a refractive index of about 1.0 to about 2.0, and a secondary glass transition temperature of about 70° C. to about −40° C. In an exemplary embodiment of the present invention, the first and the second adhesion layers 22 and 24 may include adhesive materials or adhesive sheets, respectively. For example, each of the first and the second adhesion layers 22 and 24 includes an adhesive sheet for a transparent plate such as "Clear Fit" (trade name manufactured by Mitsubishi Co. in Japan). The first adhesion layer 22 combines the diffusing plate 30 with the DBEF 50, while the second adhesion layer 24 attaches the DBEF 50 to the BEF 60.

When the backlight assembly 600 includes the optical module 300, the diffusing plate 30, the DBEF 50 and the BEF 60 combined by two adhesion layers 22 and 24, the backlight assembly 600 may be advantageously employed in an LCD device so that the LCD device including the backlight assembly 600 may have a greatly reduced volume and weight.

Figure 19:
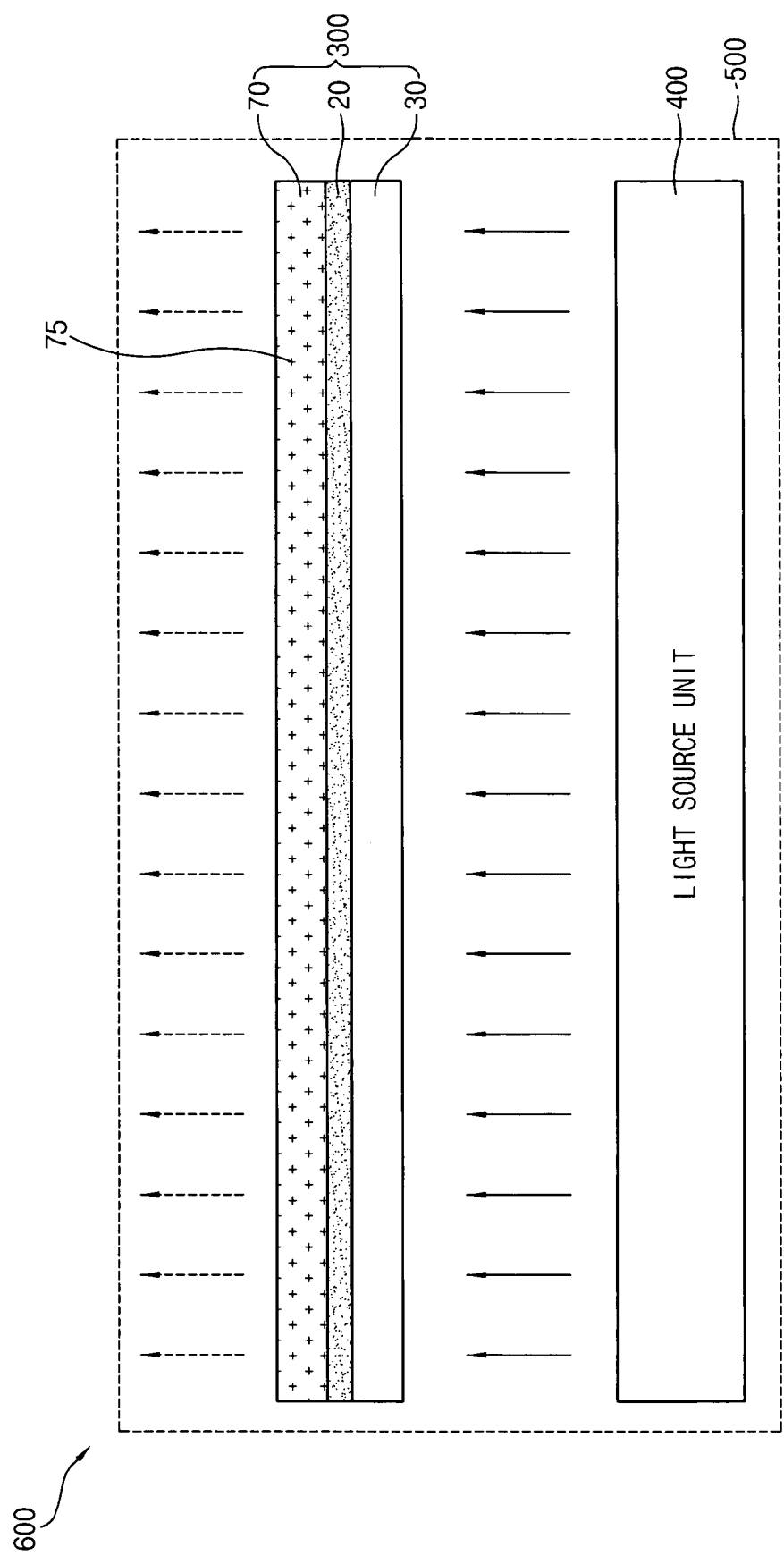
FIG. 19 is an exemplary cross-sectional view illustrating a backlight assembly in accordance with the present invention.

FIG. 19 is an exemplary cross-sectional view illustrating a backlight assembly in accordance with the present invention. In FIG. 19, a backlight assembly 600 has a construction substantially identical with that of the backlight assembly 600 in FIG. 15 except for an optical module 300.

Referring to FIG. 19, the backlight assembly 600 includes the optical module 300, a light source unit 400 and a container 500.

The optical module 300 includes a diffusing plate 30, an adhesion member 20 and a CLCF 70 as described with reference to FIG. 5.

The diffusing plate 30 diffuses a light generated from the light source unit 400 and irradiated into the optical module 300 to improve the uniformity of luminance.

The CLCF 70 includes a cholesteric liquid crystal 75. The cholesteric liquid crystal 75 includes liquid crystal molecules having bar shapes. The liquid crystal molecules are spirally twisted. The liquid crystal molecules in the cholesteric liquid crystal 75 are repeatedly twisted by a predetermined interval. This periodic interval of the liquid crystal molecules is termed the "pitch". The light incident on the cholesteric liquid crystal 75 may be reflected as a Bragg reflection because of the pitch of the liquid crystal molecules When the liquid crystal molecules in the cholesteric liquid crystal 75 are twisted in the right direction, the light reflected from the cholesteric liquid crystal 75 corresponds to right handed circular polarized light. On the other hand, the light reflected from the cholesteric liquid crystal 75 corresponds to left handed circular polarized light when the liquid crystal molecules in the cholesteric liquid crystal 75 are twisted in the left direction. The light transmitted through the cholesteric liquid crystal 75 has a polarization opposed to that of the light reflected from the cholesteric liquid crystal 75. While the light reflected from the cholesteric liquid crystal 75 corresponds to the left handed circular polarized light, the light passing through the cholesteric liquid crystal 75 corresponds to the right handed circular polarized light. In one embodiment, the left handed circular polarized light may be recycled to convert into the right handed circular polarized light so that all of the light incident into the CLCF 70 may be transmitted through the CLCF 70. Owing to the cholesteric liquid crystal 75, all of the light incident into the CLCF 70 may be converted into polarized light along a single plane.

The adhesion member 20 is attached to the diffusing plate 30 and the CLCF 70. The diffusing plate 30 is attached to one side of the adhesion member 20, and also the CLCF 70 is attached to the other side of the adhesion member 20. The adhesion member 20 is transparent to light and can be adhesively coupled to the diffusing plate 30 and the CLCF 70 with an effective adhesive strength. In addition, the adhesion member 20 may not generate bubbles when it encounters heat. The materials used in the adhesion member 20 may have a refractive index of about 1.0 to about 2.0, and a secondary glass transition temperature of about 70° C. to about −40° C. In an exemplary embodiment of the present invention, the adhesion member 20 may include an adhesive material or an adhesive sheet. For example, the adhesion member 20 includes an adhesive sheet for a transparent plate such as "Clear Fit" (trade name manufactured by Mitsubishi Co. in Japan). The adhesion member 20 may reduce the stresses generated by contractions and expansions of the diffusing plate 30 and the CLCF 70 so that the diffusing plate 30 and the CLCF 70 will not separate from each other. In addition, the adhesion member 20 may prevent the diffusing plate 30 and the CLCF 70 from bending.

Figure 20:
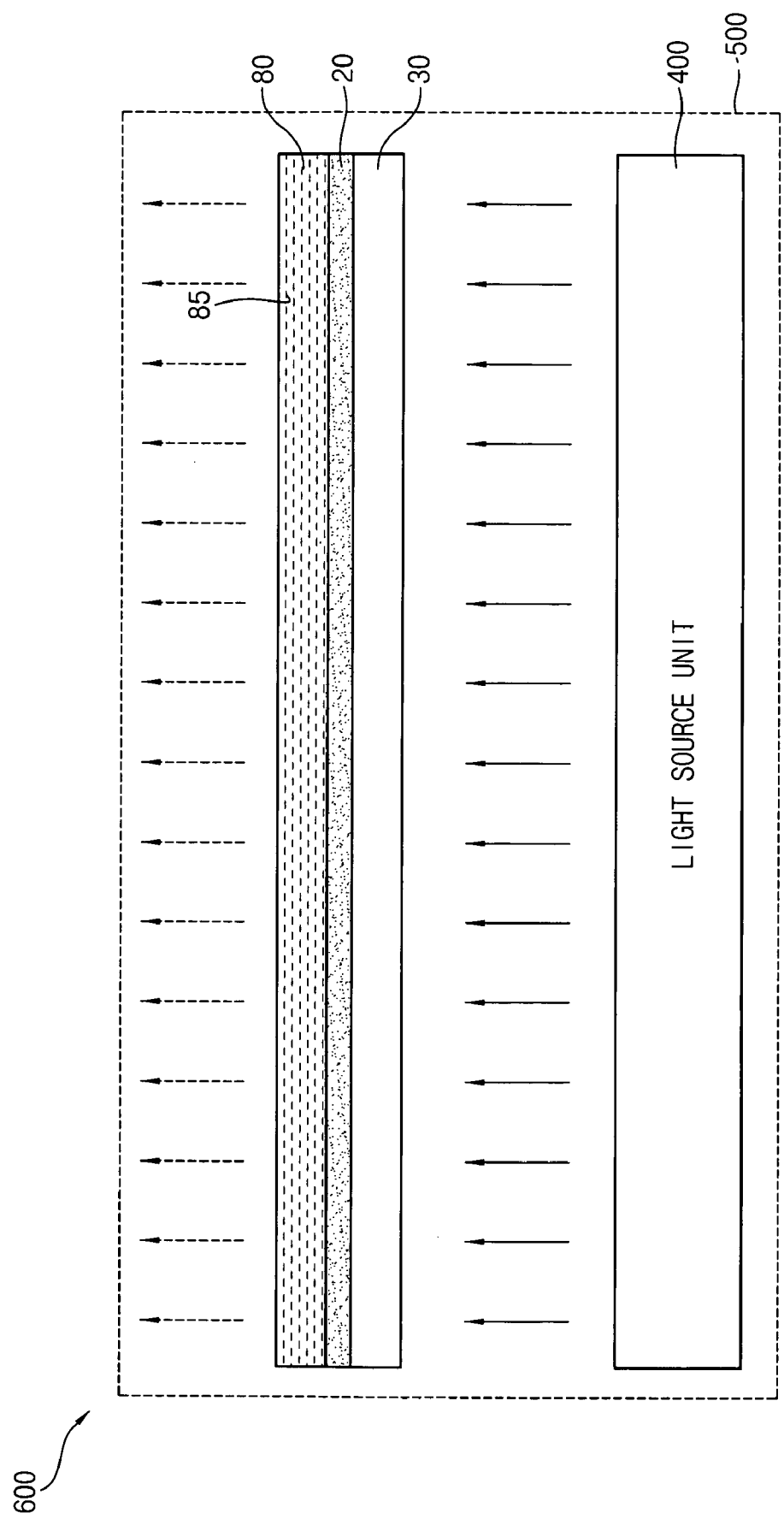
FIG. 20 is an exemplary cross-sectional view illustrating a backlight assembly in accordance with the present invention.

FIG. 20 is an exemplary cross-sectional view illustrating a backlight assembly in accordance with the present invention. In FIG. 20, the backlight assembly 600 has a construction substantially identical with that of the backlight assembly 600 in FIG. 15 except for the presence of the optical module 300.

Referring to FIG. 20, the backlight assembly 600 includes the optical module 300, a light source unit 400 and a container 500.

The optical module 300 is disposed in the container 500 to improve the characteristics of a light generated from the light source unit 400. The optical module 300 includes a diffusing plate 30, an adhesion member 20 and a DRPF 80 as described with reference to FIG. 7.

The diffusing plate 30 diffuses the light generated from the light source unit 400 and is irradiated into the optical module 300 to improve the uniformity of luminance.

The DRPF 80 includes organic particles 85 contained in a polymer film. An initial polymer film may be subjected to extension along a predetermined direction to form the polymer film. Since the polymer film of the DRPF 80 is extended as described above, the refractive index difference may be generated between an extended portion of the polymer film and an unextended portion of the polymer film, thereby promoting the formation of reflective polarized light. For example, because of the organic particles 85 in the extended portion of the polymer film, a P-wave of the light incident to the DRPF 80 passes through the DRPF 80, whereas an S-wave of the light is reflected from the DRPF 80. That is, since the light generated from the lamp includes P-waves and S-waves, the organic particles 85 in the extended portion of the polymer film passes the P-wave of the light having a wavelength of about 250 to about 800 nm through the DRPF 80, whereas the S-wave of light is reflected from the DRPF 80. The S-wave of the light reflected from the DRPF 80 is reflected again from the reflection plate of the display device so that some portions of the S-waves are converted into P-waves while other portions of the S-waves are maintained as S waves. According to this reflection of the S-wave between the DRPF 80 and the reflection plate, the P-wave of the light increases whereas the S-wave of the light decreases. Therefore, the luminance of the light passing through the DRPF 80 may be greatly augmented.

The adhesion member 20 is attached to the diffusing plate 30 and the DRPF 80. The diffusing plate 30 is attached to one side of the adhesion member 20, and the DRPF 80 is attached to the other side of the adhesion member 20.

The adhesion member 20 is transparent to light and can be adhesively coupled to the diffusing plate 30 and the BEF-RP 65 with an effective adhesive strength. In addition, the adhesion member 20 may not generate bubbles when it encounters heat. The materials used in the adhesion member 20 may have a refractive index of about 1.0 to about 2.0, and a secondary glass transition temperature of about 70° C. to about −40° C. In an exemplary embodiment of the present invention, the adhesion member 20 may include an adhesive material or an adhesive sheet. For example, the adhesion member 20 includes an adhesive sheet for a transparent plate such as "Clear Fit" (trade name manufactured by Mitsubishi Co. in Japan).

The adhesion member 20 may reduce the stress generated by contractions and expansions of the diffusing plate 30 and the DRPF 80 so that the diffusing plate 30 and the DRPF 80 may not be separated from each other. Additionally, the diffusing plate 30 and the DRPF 80 is prevented from bending due to the adhesion member 20 being disposed between the diffusing plate 30 and the DRPF 80.

Figure 21:
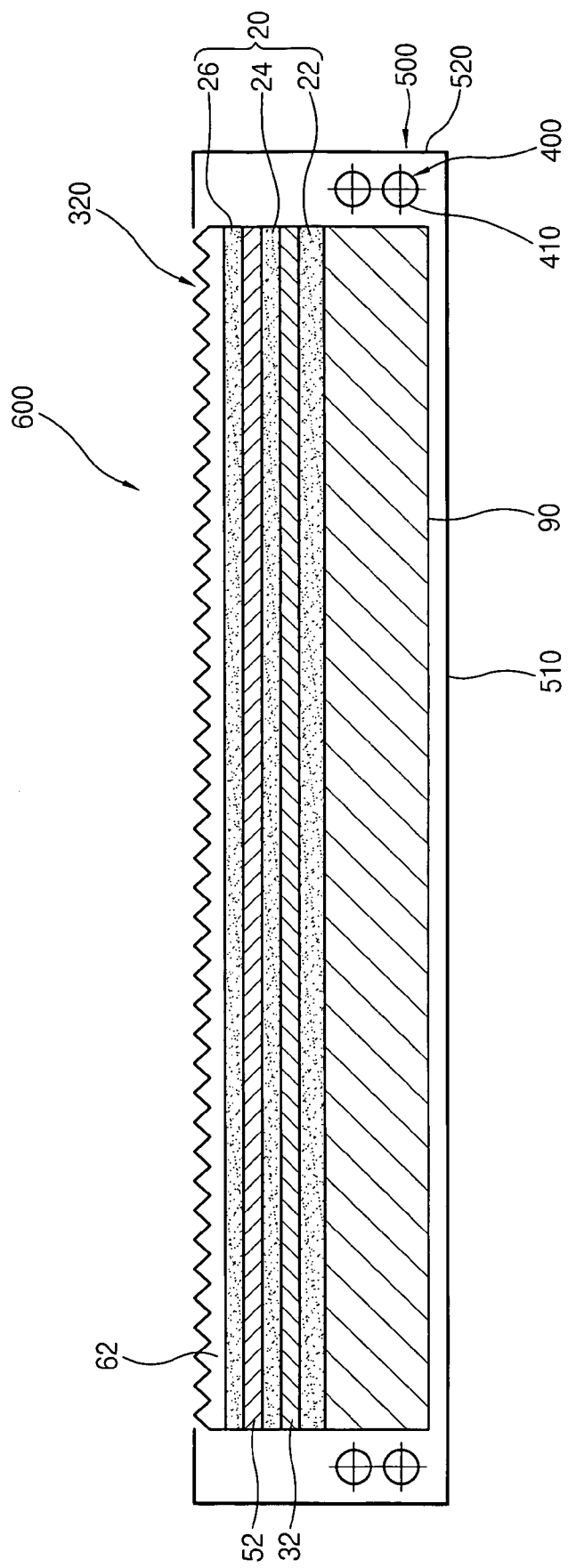
FIG. 21 is an exemplary cross-sectional view illustrating a backlight assembly in accordance with the present invention.

FIG. 21 is an exemplary cross-sectional view illustrating a backlight assembly in accordance with the present invention.

Referring to FIG. 21, a backlight assembly 600 includes an optical module 300, a light source unit 400 and a container 500.

The container 500 includes a bottom face 510 and sidewalls 520 formed on edge portions of the bottom face 510 so that a receiving space is provided in the container 500.

The light source unit 400 includes a plurality of light sources 410 disposed in the receiving space of the container 500. Each of the light sources 410 may include a cold cathode ray tube lamp or a light emitting diode.

The optical module 300 is disposed in the container 500. The optical module 300 includes an LGP 90, a diffusing sheet 32, a DBEF 52, a prism film 62 and an adhesion member 20.

The adhesion member 20 includes a first adhesion layer 22, a second adhesion layer 24 and a third adhesion layer 26. The first adhesion layer 22 is positioned between the LGP 90 and the diffusing sheet 32. The second adhesion layer 24 is disposed between the diffusing sheet 32 and the DBEF 52, while the third adhesion layer 26 is formed between the DBEF 52 and the prism film 62.

The LGP 90 is disposed on the bottom face 510 of the container 500, while the diffusing sheet 32 is formed on the LGP 90 by interposing the first adhesion layer 22 between the diffusing sheet 32 and the LGP 90. The DBEF 52 is positioned on the diffusing sheet 32 by interposing the second adhesion layer 24 between the diffusion sheet 32 and the DBEF 52. Additionally, the prism film 62 is formed on the DBEF 52 by interposing the third adhesion layer 26 between the prism film 62 and the DBEF 52. In an exemplary embodiment of the present invention, a pair of prism films may be disposed on the DBEF 52.

A light reflector may be disposed between the LGP 90 and the bottom face 510 of the container 500. Here, additional adhesion layers may be formed between the light reflector and the LGP 90 and between the LGP 90 and the bottom face 510 of the container 500, respectively.

Since various optical members of the optical module 300 are combined with one another by the adhesion member 20 including the first, second and third adhesion layers 22, 24 and 26, the optical module 300 may be fixed in the container 500 without any additional fixing member. In addition, the adhesion member 20 may prevent the bending (i.e., deformation) of the various optical members of the optical module 300 due to heat generated from the light source unit 400.

Figure 22:
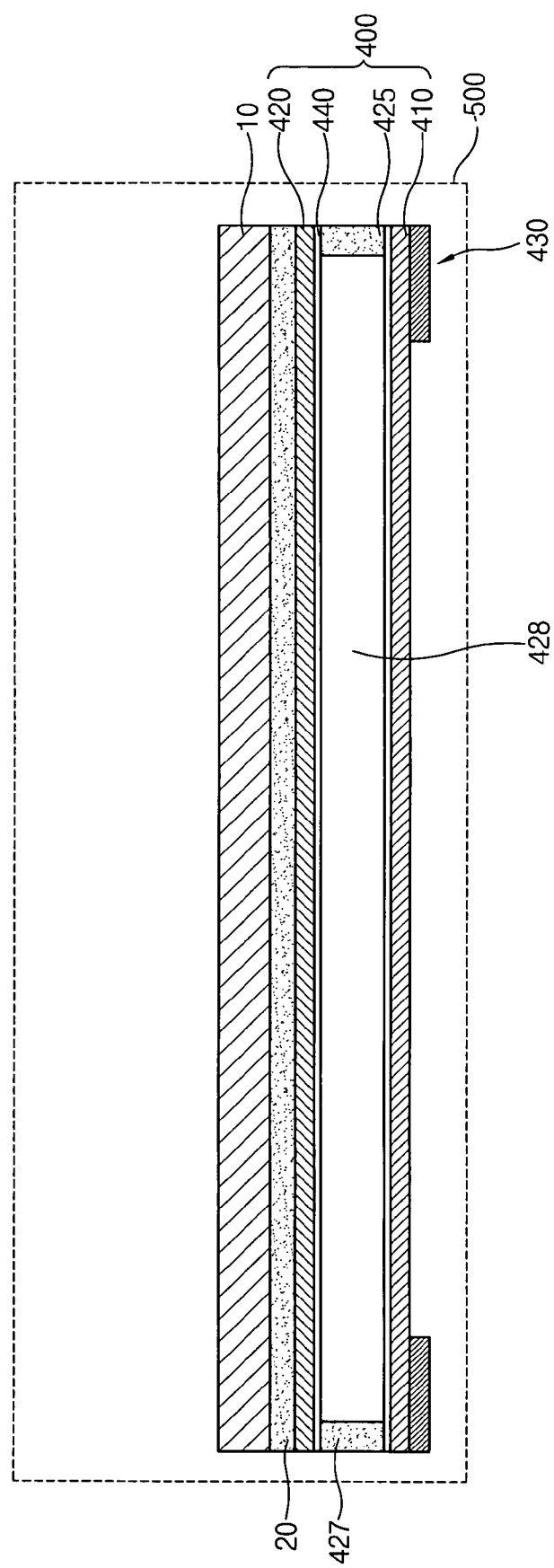
FIG. 22 is an exemplary cross-sectional view illustrating a backlight assembly in accordance with the present invention.
Figure 23:
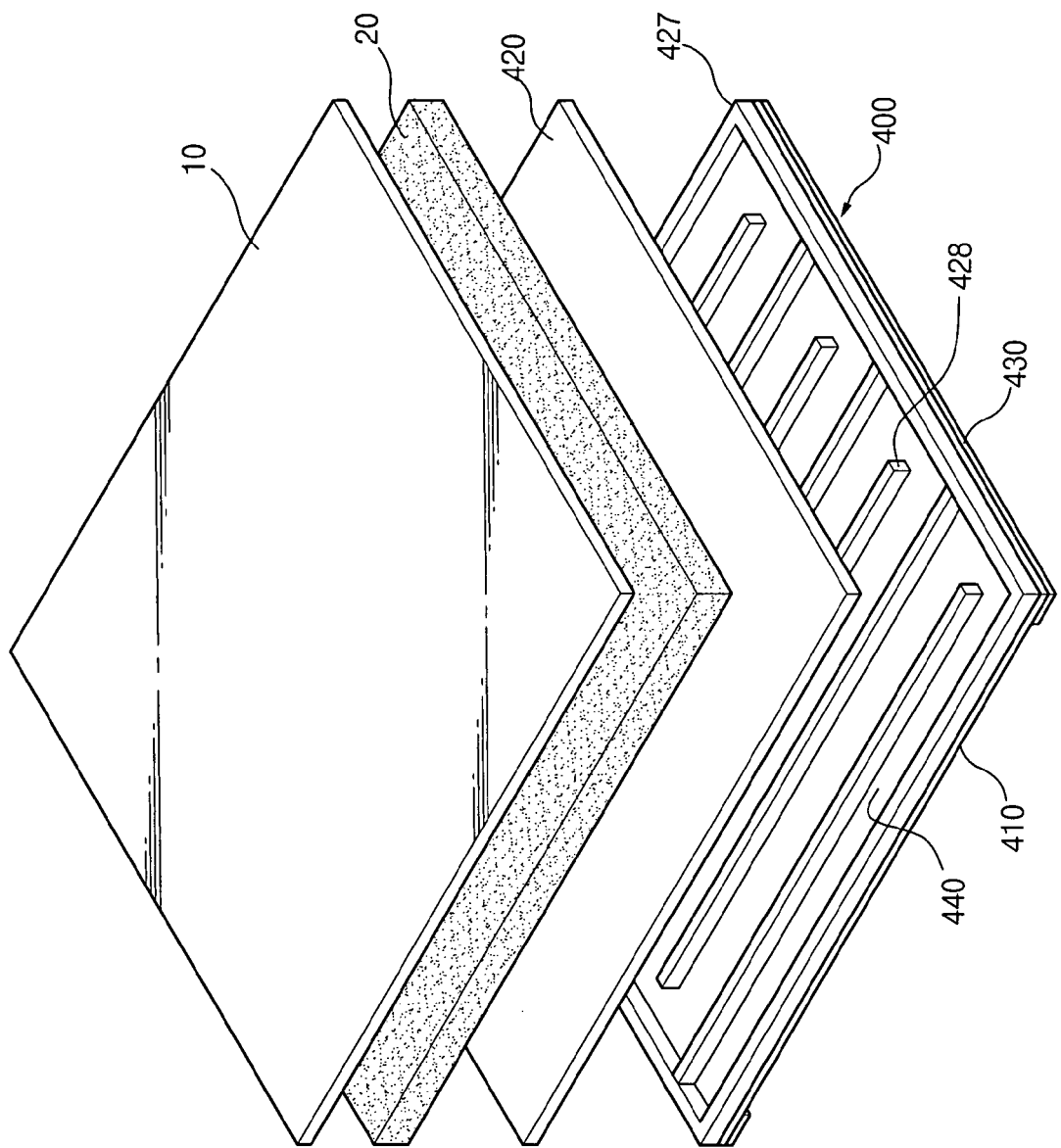
FIG. 23 is an exploded perspective view illustrating the backlight assembly in FIG. 22.

FIG. 22 is an exemplary cross-sectional view illustrating a backlight assembly in accordance with the present invention. FIG. 23 is an exploded perspective view illustrating the backlight assembly in FIG. 22.

Referring to FIGS. 22 and 23, a backlight assembly 600 includes an optical member 10, an adhesion member 20 and a light source unit 400.

The light source unit 400 may include a flat fluorescent lamp (FFL). The light source unit 400 includes a first substrate 410, a second substrate 420, a sealing member 427, a space dividing member 428, fluorescent layers 440, a discharging gas (not shown) and electrodes 430.

The first substrate 410 may have a rectangular plate-like shape. For example, the first substrate 410 has a transparent glass substrate.

The second substrate 420 may include a transparent plate or an opaque plate. The second substrate 420 may have a rectangular plate-like shape having an area substantially identical with that of the first substrate 410.

The sealing member 427 is disposed between the first substrate 410 and the second substrate 420. In particular, the sealing member 427 is positioned between peripheral portions of the first substrate 410 and the second substrate 420 to thereby form a space between the first substrate 410 and the second substrate 420.

The space dividing member 428 divides the space between the first substrate 410 and the second substrate 420 so that a plurality of discharge spaces are formed between the first substrate 410 and the second substrate 420.

The discharge space is filled with a discharging gas. Holes or recesses may be formed through the space dividing member 428 to connect the discharge spaces with one another. Hence, the discharging gas that is used to fill the discharge spaces may have a uniform pressure.

A pair of the electrodes 430 is disposed on the first substrate 410. The electrodes 430 are separated from each other by a predetermined distance. The electrodes 430 pass through the discharge spaces and facilitate generation of the discharging gas when voltages are applied to the electrodes 430.

When the discharging gas filled in the discharge spaces comprises a mercury gas, invisible rays such as ultra violet rays are generated during the discharge of the discharging gas.

The fluorescent layers 440 are formed on a surface of the second substrate 420 facing the first substrate 410 and on a surface of the first substrate 410 facing the second substrate 420. The fluorescent layers 440 convert the invisible rays generated from the discharging gas into visible rays.

The diffusing plate 10 is disposed on the second substrate 420 of the light source unit 400. The diffusing plate 10 improves the luminance of the visible rays generated by the light source unit 400.

The adhesion member 20 is disposed between the light source unit 400 and the diffusing plate 10 so as to combine the light source unit 400 with the diffusing plate 10.

Figure 24:
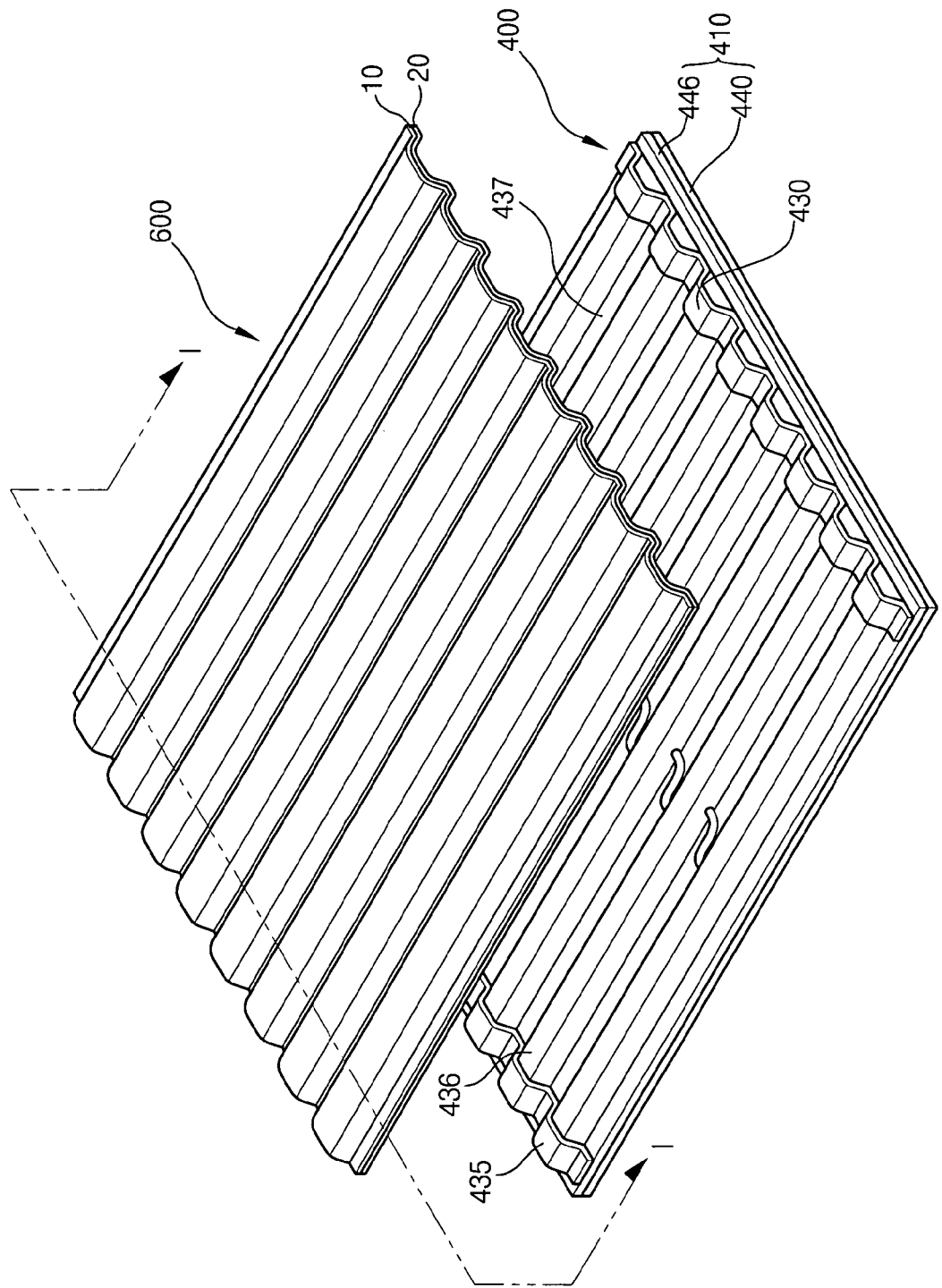
FIG. 24 is an exemplary cross-sectional view illustrating a backlight assembly in accordance with the present invention.
Figure 25:
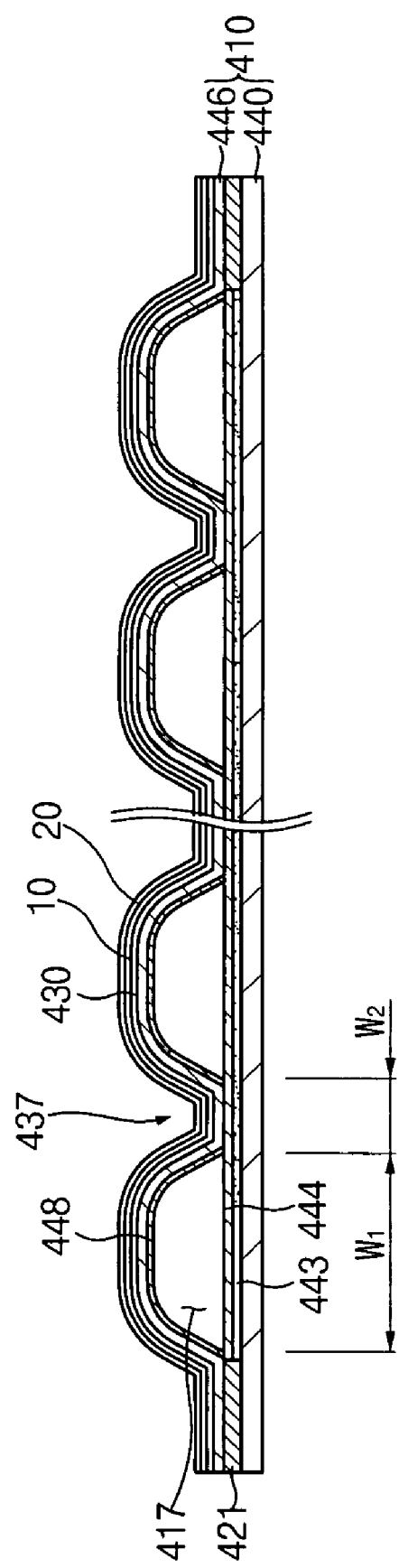
FIG. 25 is an exemplary cross-sectional view illustrating a light source unit taken along line of I-I' in FIG. 25.

FIG. 24 is an exemplary cross-sectional view illustrating a backlight assembly in accordance with the present invention. FIG. 25 is an exemplary cross-sectional view illustrating a light source unit taken along line I-I' in FIG. 24.

Referring to FIGS. 24 and 25, a backlight assembly 600 includes an optical member 10, an adhesion member 20 and a light source unit 400.

The light source unit 400 may include a FFL. The light source unit 400 includes a body 410, a first electrode 430 and a second electrode 435. The body 410 includes a plurality of discharge spaces 417 disposed in parallel so as to emit a surface type light. The discharge spaces 417 are separated from one another by predetermined intervals.

The body 410 includes a first substrate 440 and a second substrate 446 combined with the first substrate 440.

The first substrate 440 may have a rectangular plate-like shape. The first substrate 440 includes a transparent substrate such as a glass substrate in order to transmit the visible rays and to absorb the ultra violet rays. The first substrate 440 includes a fluorescent layer 444 and a light reflection layer 443. The fluorescent layer 444 converts the invisible rays (e.g., ultraviolet rays) into visible rays. The fluorescent layer 444 and the light reflection layer 443 are formed on a whole surface of the first substrate 440. Alternatively, the light reflection layer 443 may be formed on the whole surface of the first substrate 440, whereas the fluorescent layer 444 may be locally formed on portions of the first substrate 440 corresponding to the discharge spaces 417.

The second substrate 446 is combined with the first substrate 440 to provide the discharge spaces 417 between the first and the second substrates 440 and 446. The second substrate 446 may include a transparent substrate such as a glass substrate to absorb the ultra violet rays while at the same time transmitting visible rays.

The second substrate 446 includes at least two discharge generating sections 436 and at least one isolating section 437. Each of the discharge generating sections 436 comprises a discharge space and facilitates the discharge of a discharging gas. The isolating section 437 isolates the discharge generating sections 436 so that the discharge generating sections 436 are not electrically affected on each other.

Each of the discharge generating sections 436 has a shape prolonged in a first direction. The discharge generating sections 436 are disposed in parallel along a second direction substantially perpendicular to the first direction. Each of the discharge generating sections 436 has a first width $W_1$. For example, the first width $W_1$ is in the range of about 10 mm to about 12 mm.

The isolating section 437 is located between the discharge generating sections 436. The isolating section 437 protrudes from the second substrate 446 so that the isolating section 437 makes contact with the first substrate 440 when the second substrate 446 is combined with the first substrate 440. The isolating section 437 has a second width $W_2$. The second width $W_2$ of the isolating section 437 can be an amount of about 2 mm to about 5 mm. Preferably, the second width $W_2$ of the isolating section 437 may be in a range of about 2.4 mm to about 2.8 mm.

The second substrate 446 may have its discharge generating sections 436 and the isolating section 437 manufactured by pressing a heated substrate having a plate-like shape after the substrate is heated to a predetermined temperature. The first substrate 430 may be combined with the second substrate 446 by a vacuum pressure.

The discharge generating sections 436 may have different heights, respectively. Alternatively, the discharge generating sections 436 may have substantially identical heights. The discharge generating sections 436 may have various shapes such as semicircular shapes, rectangular shapes, trapezoid shapes, or the like.

The second substrate 446 may be combined with the first substrate 430 by using a sealing member 421. The sealing member 421 may include a frit, which is a mixture of glass and metal. The frit may have a melting point substantially lower than that of glass. The sealing member 421 is entirely disposed between peripheral portions of the first and the second substrates 430 and 446. Alternatively, the sealing member 421 may be locally formed between peripheral portions of the first and the second substrates 430 and 446.

The discharge gas is injected into the discharge spaces. The discharge gas may include a mercury gas, a neon gas, am argon gas, a xenon gas, a krypton gas, or the like.

A connecting portion such as a connecting hole or a connecting recess is formed through the isolating section 437 so that the discharge generating sections 437 are connected to each other. Hence, the discharge gas injected into the discharge spaces may have a uniform pressure. The connecting section may have a serpentine shape. The connection portion increases the length of a passage that connects one discharge space to another discharge space so that plasma generated in one discharge space may not move to another discharge space. The connecting portion may have various shapes. An exemplary shape is an S shape or a shape of an oblique line.

The electrodes 430 and 435 are disposed on the second substrate 446 to generate the discharge of the discharging gas in the discharge spaces. Alternatively, the electrodes 430 and 435 may be formed on the first substrate 440. The electrodes 430 and 435 traverse the discharge generating sections 436. In one exemplary embodiment of the present invention, a pair of the electrodes 430 and 435 is disposed in parallel on the second substrate 446.

The fluorescent layer 448 may be formed on the second substrate 446 by spraying slurry onto the second substrate 446. The fluorescent layer 448 may include a binder such as nitrocellulose or ethylcellulose and a solution such as 2-(2-butoxyethoxy)ethyl acetate (BCA).

The light source unit 400 further includes a diffusing plate 10 on the second substrate 446. The diffusing plate 10 improves the uniformity of luminance of the visible light generated from the light source unit 400. The diffusing plate 10 may have a concave and convex structure corresponding to the second substrate 446.

The adhesion member 20 is disposed between the diffusing plate 10 and the second substrate 446 of the light source unit 400 so as to attach the diffusing plate 10 to the second substrate 446. The adhesion member 20 may have a concave and convex structure corresponding to those of the second substrate 446 and the diffusing plate 10.

FIG. 26 is an exemplary cross-sectional view illustrating a display device in accordance with the present invention.

Referring to FIG. 26, a display device 800 includes a backlight assembly 600 and a display panel 700.

The backlight assembly 600 includes a light source unit 400, an optical module 300 and a container 500.

The light source unit 400 may include a point light source such as a light emitting diode, a line light source such as a cold cathode ray tube lamp, or a surface light source such as an FFL.

The optical module 300 includes optical members 10 and 17, and an adhesion member 20 disposed between the optical members 10 and 17.

Each of the optical members 10 and 17 may include a DBEF, a BEF, a BEF-RP, a CLCF, a DRPF, a retardation plate, a protective film, an LGP, a polarizing plate, a light reflector, or the like.

The adhesion member 20 attaches one optical member 10 to another optical member 17. The adhesion member 20 is transparent to light and can be adhesively coupled to the diffusing plate 30 and the BEF-RP 65 with an effective adhesive strength. In addition, the adhesion member 20 may not generate bubbles when it encounters heat. The materials used in the adhesion member 20 may have a refractive index of about 1.0 to about 2.0, and a secondary glass transition temperature of about 70° C. to about −40° C. In an exemplary embodiment of the present invention, the adhesion member 20 may include an adhesive material or an adhesive sheet. For example, the adhesion member 20 includes an adhesive sheet for a transparent plate such as "Clear Fit" (trade name manufactured by Mitsubishi Co. in Japan).

The adhesion member 20 may reduce a stress generated due to contractions or expansions of the optical members 10 and 17. Therefore, the optical members 10 and 17 will not be deformed or separated from each other.

The display panel 700 includes a first display substrate 710, a second display substrate 720 and a liquid crystal layer 730.

The first display substrate 710 includes a plurality of pixel electrodes. The pixel electrodes may be arranged to form a matrix shape. Each of the pixel electrodes may be electrically connected to a drain electrode of a thin film transistor (TFT). Each of the pixel electrodes may include a transparent conductive material such as indium tin oxide (ITO), indium zinc oxide (IZO), amorphous indium tin oxide (a-ITO), or the like.

The second display substrate 720 faces the first display substrate 710. A common electrode corresponding to the pixel electrodes is disposed on the second display substrate 720. The common electrode may also include a transparent conductive material such as ITO, IZO, a-ITO, or the like. A color filter may be formed at portion of the second display substrate 720 corresponding to the pixel electrodes. Alternatively, the color filter may be formed on the first display substrate 710.

According to the present invention, various optical members for improving the characteristics of incident light are combined with each other by using at least one adhesion member so that an optical module having the aforementioned optical members may have a greatly reduced volume and weight. In addition, since the adhesion member is disposed between the optical members, the optical members may not be deformed or separated from each other. When a backlight assembly comprises the optical module, the backlight assembly may also have a considerably reduced volume and weight. In case that the optical module is employed in a display device such as an LCD device, the display device may display an improved image and may have a greatly reduced volume and weight.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An optical module comprising:
   an optical member configured to emit a light by converting characteristics of the light, the optical member having a first modulus of elasticity; and
   a transparent adhesion member integrally formed with the optical member, the transparent adhesion member having a second modulus of elasticity, wherein the first modulus of elasticity is substantially identical to the second modulus of elasticity.

2. The optical module of claim 1, wherein the optical module provides the light onto a display region of a display device for displaying images.

3. The optical module of claim 1, wherein the transparent adhesion member has a refractive index of about 1.0 to about 2.0.

4. The optical module of claim 1, wherein the transparent adhesion member comprises a material that has a glass transition temperature of about 70° C. to about −40° C.

5. The optical module of claim 1, wherein the transparent adhesion member comprises at least one material selected from the group consisting of methyl methacrylate, ethyl methacrylate, n-propyl methacrylate, n-butyl methacrylate, n-hexyl methacrylate (nHMA), isopropyl methacrylate, isobutyl methacrylate, t-butyl methacrylate, cyclohexyl methacrylate, benzyl methacrylate, phenyl methacrylate, 1-phenylethyl methacrylate, 2-phenylethyl methacrylate, furfuryl methacrylate, methyl acrylate, ethyl acrylate, n-butyl acrylate, 2-chloroethyl acrylate, vinyl acetate, vinyl benzoate, vinyl phenylacetate, vinyl chloro acetate, acrylonitrile, x-methyl acrylonitrile, methyl-x-chloroacrylate, atropic acid, methyl ester, o-chlorostyrene, p-fluorostyrene, (o,p)-fluorostyrene, p-isopropyl styrene and a combination comprising at least one of the foregoing materials.

6. The optical module of claim 1, wherein the optical member further comprises:
   a diffusing plate attached to a first side of the transparent adhesion member to diffuse the light; and
   a dual brightness enhancing film attached to a second side of the transparent adhesion member to improve a luminance of the light.

7. The optical module of claim 6, wherein the optical member further comprises a brightness enhancing film facing the dual brightness enhancing film to collect a light emanating from the dual brightness enhancing film, and wherein the transparent adhesion member comprises a first adhesion layer disposed between the diffusing plate and the dual brightness enhancing film, and a second adhesion layer disposed between the dual brightness enhancing film and the brightness enhancing film.

8. The optical module of claim 7, wherein the brightness enhancing film comprises a plurality of prismatic patterns having an angle of about 22.5° relative to an edge portion of the brightness enhancing film to prevent a Moire Effect.

9. The optical module of claim 1, wherein the optical member further comprises:
   a diffusing plate attached to a first side of the transparent adhesion member to diffuse the light; and a brightness enhancing film-reflect polarizer attached to a second side of the transparent adhesion member to improve a luminance of the light and to collect the light.

10. The optical module of claim 1, wherein the optical member further comprises:
   a diffusing plate attached to a first side of the transparent adhesion member to diffuse the light; and a cholesteric liquid crystal film attached to a second side of the transparent adhesion member to improve a luminance of the light, the cholesteric liquid crystal film comprising a cholesteric liquid crystal.

11. The optical module of claim 1, wherein the optical member further comprises:
   a diffusing plate attached to a first side of the transparent adhesion member to diffuse the light; and a diffusive reflective polarizer film attached to a second side of the transparent adhesion member to improve a luminance of the light, the diffusive reflective polarizer film comprising a polymer film and organic particles disposed in the polymer film.

12. The optical module of claim 1, wherein the optical member further comprises a light guide plate to improve a luminance uniformity of the light.

13. The optical module of claim 1, wherein the optical member further comprises a polarizing plate to polarize the light.

14. The optical module of claim 1, further comprising a detachable sheet disposed on the transparent adhesion member.

15. An optical module comprising:
   an optical member configured to emit a light by converting characteristics of the light; and
   a flexible transparent adhesion member integrally formed with the optical member, the flexible transparent adhesive member preventing the optical member from deforming by reducing a stress generated in the optical member,
   wherein the optical member has a first modulus of elasticity and the flexible transparent adhesion member has a second modulus of elasticity, the second modulus of elasticity is substantially identical with the first modulus of elasticity.

* * * * *